US009106368B2

(12) United States Patent
Suzuki et al.

(10) Patent No.: US 9,106,368 B2
(45) Date of Patent: Aug. 11, 2015

(54) RADIO COMMUNICATION SYSTEM, BASE STATION APPARATUS, MOBILE STATION APPARATUS, RADIO COMMUNICATION METHOD, AND PROGRAM

(75) Inventors: Shoichi Suzuki, Osaka (JP); Shohei Yamada, Osaka (JP); Daiichiro Nakashima, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 13/201,655

(22) PCT Filed: Feb. 22, 2010

(86) PCT No.: PCT/JP2010/052639
§ 371 (c)(1),
(2), (4) Date: Aug. 16, 2011

(87) PCT Pub. No.: WO2010/098289
PCT Pub. Date: Sep. 2, 2010

(65) Prior Publication Data
US 2011/0299513 A1 Dec. 8, 2011

(30) Foreign Application Priority Data
Feb. 24, 2009 (JP) .................. 2009-040337

(51) Int. Cl.
H04W 4/00 (2009.01)
H04L 5/00 (2006.01)
(52) U.S. Cl.
CPC .............. *H04L 5/0007* (2013.01); *H04L 5/001* (2013.01); *H04L 5/0053* (2013.01)
(58) Field of Classification Search
CPC ..... H04L 1/1861; H04W 88/08; H04W 72/00
USPC ............. 370/329; 455/460, 423, 522
See application file for complete search history.

(56) References Cited

U.S. PATENT DOCUMENTS 8,365,281 B2* 1/2013 Tateishi et al. ............. 726/22
8,385,281 B2* 2/2013 Pan et al. ................ 370/329
(Continued)

FOREIGN PATENT DOCUMENTS

WO WO 2008/157692 A2 12/2008
WO WO 2009/041779 A1 4/2009
WO WO 2010/050036 A1 5/2010

OTHER PUBLICATIONS

3GPP TSG RAN WG1 #55, R1-084165, "PDCCH Structure far LTE-A", Samsung, Agenda item 11.1, Nov. 10-14, 2008.
(Continued)

*Primary Examiner* — Andrew Lai
*Assistant Examiner* — Jamaal Henson
(74) *Attorney, Agent, or Firm* — Birch, Stewart, Kolasch & Birch, LLP

(57) ABSTRACT

A mobile station apparatus 2 is assigned multiple component carriers in an uplink and a downlink by a base station apparatus and communicates with the base station apparatus by using the component carriers. The mobile station apparatus 2 includes a downlink control channel detector 67 and a carrier component identifying unit 53a. The downlink control channel detector 67 detects a downlink control channel from multiple search spaces where to detect the downlink control channel. From the search space where the downlink control channel detected by the downlink control channel detector 67 is arranged, the carrier component identifying unit 53a identifies the component carriers controlled with downlink control information transmitted in the downlink control channel and addressed to the mobile station apparatus. This makes it possible to identify the component carrier controlled with the downlink control information (DCI) transmitted in the downlink control channel (PDCCH) without increasing the coding ratio of the downlink control channel (PDCCH).

12 Claims, 10 Drawing Sheets

(56) References Cited

U.S. PATENT DOCUMENTS

| | | | |
|---|---|---|---|
| 2009/0088148 A1* | 4/2009 | Chung et al. | 455/423 |
| 2010/0195583 A1* | 8/2010 | Nory et al. | 370/329 |
| 2011/0199995 A1* | 8/2011 | Ito et al. | 370/329 |
| 2011/0201333 A1* | 8/2011 | Kwon et al. | 455/434 |

OTHER PUBLICATIONS

3GPP TSG RAN WG1 Meeting #55, R1-084248, " DL Layered Control Signal Structure in LTE-Advanced", NTT DoCoMo, Agenda item 11.1, pp. 1-7, Nov. 10-14, 2008.

3GPP TSG RAN1 #52, R1-080731, "PDCCH Search Space Assignment and Signaling", Motorola, Agenda item 6.1.3, Feb. 11-15, 2008.

TSG-RAN WG1 #55, R1-084316, "Summary of email discussion on support for wider bandwidth", Nokia, Agenda item 11.1, Nov. 10-14, 2008.

TSG-RAN WG1 #55, R1-084375, "Summary of email discussion on Uplink transmission scheme", Ericsson, Agenda item 11.2, Nov. 10-14, 2008.

TSG-RAN WG1 #55bis, R1-090375, "Control signaling for carrier aggregation", Ericsson, Agenda item 12.2, Jan. 12-16, 2009.

Japanese Office Action issued in Japanese Patent Application No. 2011-501581 on Dec. 20, 2011.

Australian Office Action issued in Australian Patent Application No. 2010218889 on May 2, 2013.

CMCC, "Resource Allocation and PDCCH Design Issues in Carrier Aggregation", 3GPP TSG-RAN WG1 #55bis, Ljubljana, Slovenia, Jan. 12-16, 2009, R1-090337, 6 pages, retrieved from the Internet at URL:http://www.3gpp.org/ftp/tsg_ran/WG1_RL1/TSGR1_56/Docs/.

Motorola, "Temporary C-RNTI, C-RNTI use with Common and UE Specific Search Spaces," 3GPP TSG-RAN1 Meeting #55, Prague, Czech Republic, Nov. 10-15, 2008, R1-084503, pp. 1-5.

Motorola, "PDCCH Search Space Assignment Hashing Function", 3GPP TSG RAN1 #52bis, Shenzhen, China, Mar. 31-Apr. 4, 2008, R1-081672 (R1-081289), 7 pages, XP050110062, retrieved on Apr. 9, 2008, 3rd Generation Partnership Project (3GPP), Mobile Competence Centre; 650, Route Des Lucioles; F-06921 Sophia-Antipolis Cedex; France, vol. RAN WG1.

Samsung, "UE-Specific Search Space", 3GPP TSG RAN WG1 Meeting #52bis, Shenzhen, China, Mar. 31-Apr. 4, 2008, R1-081212, 7 pages, XP050109656, retrieved on Mar. 26, 2008, 3rd Generation Partnership Project (3GPP), Mobile Competence Centre, 650, Route Des Lucioles, F-06921, Sophia-Antipolis Cedex; Franced, vol. RAN WG1.

Supplementary European Search Report issued in European Application No. 10746170.9 on May 13, 2015.

ZTE, "Downlink Control Structure for LTE-A", 3GPP TSG-RAN WG1 Meeting #56, Feb. 9-13, 2009, Athens, Greece, R1-090628, 5 pages, XP050318509, retrieved on Feb. 3, 2009, 3GPP Draft, Mobile Competence Centre, 650, Route Des Lucioles, F-06921 Sophia-Antipolis Cedex, France.

* cited by examiner

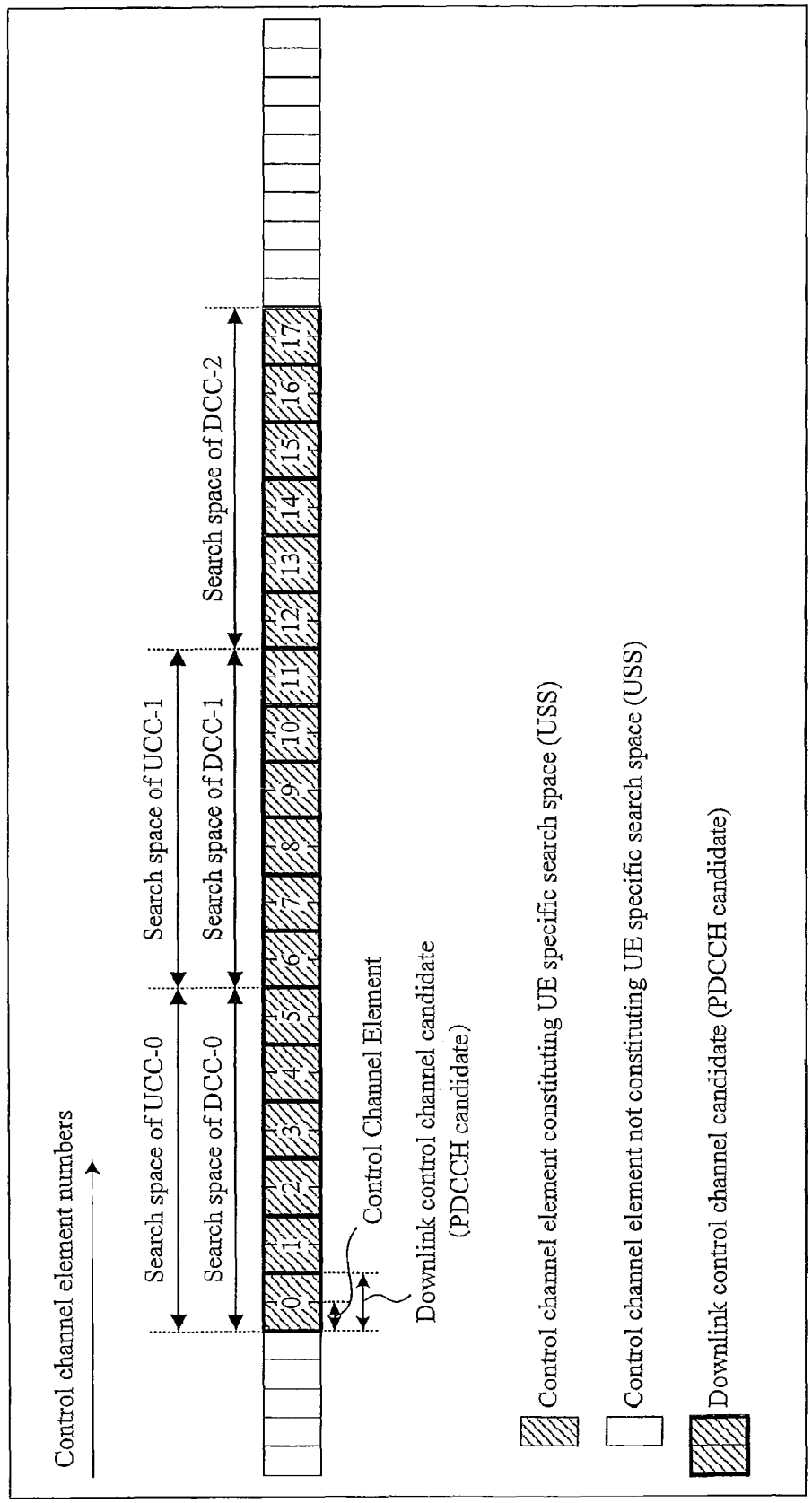

RADIO COMMUNICATION SYSTEM, BASE STATION APPARATUS, MOBILE STATION APPARATUS, RADIO COMMUNICATION METHOD, AND PROGRAM

TECHNICAL FIELD

The present invention relates to a radio communication system, a base station apparatus, a mobile station apparatus, a radio communication method, and a program.

BACKGROUND ART

With advancement of a radio access method and a radio network for cellular mobile communication (hereinafter referred to as Long Term Evolution (LTE) or "Evolved Universal Terrestrial Radio Access (EUTRA)," the 3rd Generation Partnership Project (3GPP) has been studying a radio access method and a radio network (hereinafter referred to as "Long Term Evolution-Advanced (LTE-A)" or "Advanced EUTRA") for achieving further high-speed data communication utilizing wider range frequencies.

LTE uses an orthogonal frequency division multiplexing (OFDM) scheme which is multi-carrier transmission for a downlink. For an uplink, LTE uses a single carrier communication scheme of a DFT (discrete Fourier transform)—Spread OFDM scheme which is single carrier transmission. In contrast, it is proposed that LTE-A uses the OFDM scheme for the downlink, and newly uses, for the uplink, the OFDM scheme, a Clustered DFT-Spread OFDM scheme, and a N*DFT-Spread OFDM scheme which are the multi-carrier communication schemes, in addition to the DFT-Spread OFDM scheme, (see Non-patent Document 1 below).

For the downlink of radio communication from a base station apparatus to a mobile station apparatus, LTE uses a broadcast channel (Physical Broadcast Channel; PBCH), a downlink control channel (Physical Downlink Control Channel; PDCCH), a downlink shared channel (Physical Downlink Shared Channel; PDSCH), a multicast channel (Physical Multicast Channel; PMCH), a control format indicator channel (Physical Control Format Indicator Channel; PCFICH), and an HARQ indicator channel (Physical Hybrid ARQ Indicator Channel; PHICH). For the uplink of radio communication from the mobile station apparatus to the base station apparatus, LTE uses an uplink shared channel (PUSCH: Physical Uplink Shared Channel), an uplink control channel (PUCCH: Physical Uplink Control Channel), and a random access channel (PRACH: Physical Random Access Channel).

Meanwhile, LTE-A is required to have compatibility with LTE, that is, to enable a base station apparatus supporting LTE-A to communicate with both types of mobile station apparatuses supporting LTE-Advanced and mobile station apparatuses supporting LTE, and to enable a mobile station apparatus supporting LTE-A to perform radio communication with base stations supporting either of LTE-A and LTE. Thus, studies have been made on use of the same channel structure as in LTE. In addition, while a frequency band used in a general mobile communication system is contiguous, there is proposed utilization of multiple contiguous/non-contiguous frequency bands (hereinafter, referred to as "carrier components (CCs)" or "component carriers" (CCs)), as a single frequency band (wide frequency band) (frequency band aggregation: sometimes referred to as spectrum aggregation, carrier aggregation, frequency aggregation, or the like) (see Non-patent Document 2 below).

Further, studies have been made on configuring a downlink control channel (PDCCH) for each carrier component in the downlink in LTE-A. By using the downlink control channel (PDCCH), a base station transmits a downlink grant (DL grant) for each carrier component in the downlink, the downlink grant being control information including information indicating radio resource allocation (RA) of a downlink shared channel (PDSCH). By using the downlink control channel (PDCCH), the base station also transmits an uplink grant (UL grant) for each carrier component in the uplink, the uplink grant being control information including a region indicating radio resource allocation (RA) of the uplink shared channel (PUSCH) in the carrier component in the uplink.

Another proposal for LTE-A is that identities for identifying carrier components corresponding to the uplink grant and the downlink grant are included in the uplink grant and the downlink grant, respectively, and that a base station apparatus transmits an uplink grant and a downlink grant addressed to the same mobile station apparatus by using multiple downlink control channels (PDCCHs) on the same carrier component in the downlink (see Non-patent Document 3 and Non-patent Document 4 below).

The uplink grant and the downlink grant in LTE are constituted of information for the uplink shared channel (PUSCH) and the downlink shared channel (PDSCH), such as information on modulation schemes, information on coding schemes, and information on HARQ, in addition to the information indicating the radio resource allocation (RA). In addition, the mobile station apparatus is identified by using a 16-bit mobile station identity (also referred to as a radio network temporary identity; RNTI or a user equipment identity; UE ID) which is uniquely identifiable in the base station apparatus and included in the uplink grant and the downlink grant.

The following are cited as related technical documents.

PRIOR ART DOCUMENTS

Non-Patent Documents

Non-Patent Document 1: "Summary of email discussion on Uplink transmission scheme", 3GPP TSG RAN WG1 Meeting #55, R1-084375, Nov. 10-14, 2008.

Non-Patent Document 2: "Summary of email discussion on support for wider bandwidth", 3GPP TSG RAN WG1 Meeting #55, R1-084316, Nov. 10-14, 2008.

Non-Patent Document 3: "PDCCH Structure for LTE-A", 3GPP TSG RAN WG1 Meeting #55, R1-084165, Nov. 10-14, 2008.

Non-Patent Document 4: "Control signaling for carrier aggregation", 3GPP TSG RAN WG1 Meeting #55bis, R1-090375, Jan. 12-16, 2009.

SUMMARY OF THE INVENTION

Problems to be Solved by the Invention

However, inclusion of the identities for identifying the carrier components in the uplink grant and the downlink grant increases the coding ratio of the uplink grant and the downlink grant. This causes a problem that the possibility of a failure of decoding of the downlink shared channel (PDSCH) is increased because the mobile station apparatus is more likely to fail to decode the uplink grant and the downlink grant in the downlink control channel (PDCCH).

An object of the present invention is to identify carrier components corresponding to the uplink grant and the downlink grant without increasing the coding ratio of the uplink grant and the downlink grant.

Solution to Problem

Means for Solving the Problems

An aspect of the present invention provides a base station apparatus which allocates a plurality of component carriers in an uplink and a downlink to a mobile station apparatus and communicates with the mobile station apparatus by using the component carriers, the base station apparatus including: a search space/carrier component associating unit which associates each of a plurality of search spaces where the mobile station apparatus is to detect a downlink control channel, with one of the component carriers controlled with downlink control information transmitted in the downlink control channel and addressed to the mobile station apparatus; a multiplexer which arranges a signal of the downlink control channel in one of the search spaces with which the component carrier controlled with the downlink control information of the downlink control channel is associated by the search space/carrier component associating unit; and a transmission processor which transmits the signal of the downlink control channel arranged by the multiplexer. This makes it possible to identify component carriers controlled with the downlink control information (DCI) transmitted in the downlink control channel (PDCCH) without increasing the coding ratio of the downlink control channel (PDCCH).

Preferably, the base station apparatus further includes a controller which controls a region of each of the search spaces in accordance with the number of component carriers associated by the search space/carrier component associating unit. The controller preferably performs the control so that the region of the search space is made smaller as the number of the component carriers associated by the search space/carrier component associating unit is increased and performs the control so that the region of the search space larger as the number of the associated component carriers is decreased.

Furthermore, the present invention is a mobile station apparatus which is assigned a plurality of component carriers in an uplink and a downlink by a base station apparatus and communicates with the base station apparatus by using the component carriers, the mobile station apparatus characterized by including: a downlink control channel detector which detects a downlink control channel in each of a plurality of search spaces where to detect a signal of the downlink control channel; and a carrier component identifying unit which identifies the component carrier controlled with downlink control information transmitted in the downlink control channel and addressed to the mobile station apparatus, from the search space where the downlink control channel detected by the downlink control channel detector is arranged. This makes it possible to associate the mobile station apparatus with the base station apparatus.

Preferably, the mobile station apparatus further includes a controller which controls a region of each of the search spaces where the downlink control channel detector is to detect the downlink control channel, in accordance with the number of component carriers allocated to the mobile station apparatus. The controller preferably performs the control so that the region of the search space where the downlink control channel detector is to detect the downlink control channel is made smaller as the number of the component carriers allocated to the mobile station apparatus is increased and performs the control so that the region of the search space where the downlink control channel detector is to detect the downlink control channel is made smaller as the number of the component carriers allocated to the mobile station apparatus is decreased.

Another aspect of the present invention provides a radio communication method in a base station apparatus which allocates a plurality of component carriers in an uplink and a downlink to a mobile station apparatus and communicates with the mobile station apparatus by using the component carriers, the radio communication method including: a first step of associating each of a plurality of search spaces where the mobile station apparatus is to detect a downlink control channel, with one of the component carriers controlled with downlink control information transmitted in the downlink control channel and addressed to the mobile station apparatus; a second step of arranging a signal of the downlink control channel in the search space with which the component carrier controlled with the downlink control information of the downlink control channel is associated in the first step; and a third step of transmitting the signal of the downlink control channel arranged in the second step.

Also provided is a radio communication method in a mobile station apparatus which is assigned a plurality of component carriers in an uplink and a downlink by a base station apparatus and which communicates with the base station apparatus by using the component carriers, the radio communication method characterized by including: a first step of detecting a downlink control channel in the plurality of search spaces where to detect a signal of the downlink control channel; and a second step of identifying the component carrier controlled with downlink control information transmitted in the downlink control channel and addressed to the mobile station apparatus, from the search space where the downlink control channel detected in the first step is arranged.

The present invention may be a program for causing a computer to execute the radio communication method described above and may be a computer-readable recording medium in which the program is recorded. The program may be obtained by a transmission medium such as the Internet.

The present description includes the content in its entirety described in the description and/or the drawings of Japanese Patent Application No. 2009-040337 which is the base of the priority of this application.

Effects of the Invention

The radio communication system according to the present invention makes it possible to identify component carriers corresponding to the uplink grant and the downlink grant without increasing the coding ration of the uplink grant and the downlink grant.

BRIEF DESCRIPTION OF DRAWINGS

FIG. 10 is a diagram showing a modification of the UE specific search spaces (USSs) in the embodiment.

EXPLANATION OF THE REFERENCE NUMERALS

1 . . . base station apparatus, 2 . . . mobile station apparatus, 3 . . . higher layer, 3a . . . radio resource controller, 5 . . . controller, 5a . . . search space/carrier component associating unit, 7 . . . reception antenna, 11 . . . reception processor, 15 . . . demultiplexer, 17 . . . demodulator, 21 . . . decoder, 23 . . . encoder, 25 . . . modulator, 27 . . . multiplexer, 31 . . . transmission processor, 33 . . . transmission antenna, 51 . . . higher layer, 51a . . . radio resource controller, 53 . . . controller, 53a . . . carrier component identifying unit, 55 . . . reception antenna, 57 . . . reception processor, 61 . . . demultiplexer, 63 . . . demodulator, 65 . . . decoder, 67 . . . downlink control channel detector, 71 . . . encoder, 73 . . . modulator, 77 . . . multiplexer, 81 . . . transmission processor, 83 . . . transmission antenna

MODES FOR CARRYING OUT THE INVENTION

Figure 1:
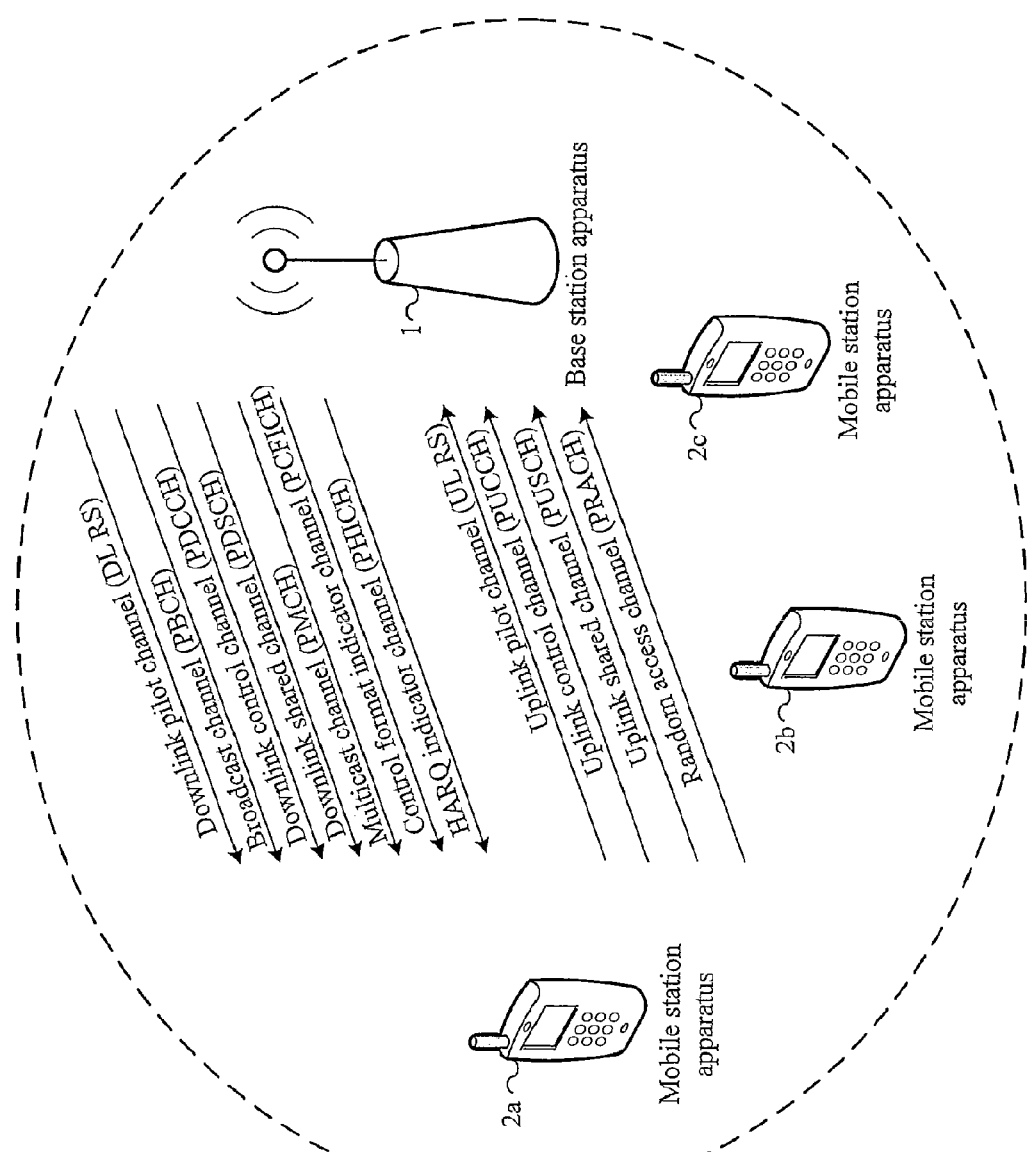
FIG. 1 is a diagram showing an example of a channel structure in radio communication of an embodiment of the present invention.

Hereinafter, a description is given of a radio communication technique according to an embodiment of the present invention by referring to the drawings. The radio communication system according to the embodiment includes a base station apparatus and multiple mobile station apparatuses. FIG. 1 is a diagram showing an example of a channel structure in radio communication of the embodiment of the present invention. A base station apparatus 1 communicates with mobile station apparatuses 2a, 2b, and 2c (there may be any number of the mobile station apparatuses and the description will be given below by denoting any of the mobile station apparatuses by reference numeral 2 as a representative) by using multiple carrier components.

In the embodiment, a downlink from the base station apparatus 1 to the mobile station apparatus 2 includes a downlink pilot channel (or referred to as a Downlink Reference Signal (DL RS)), a broadcast channel (Physical Broadcast Channel; PBCH), a downlink control channel (Physical Downlink Control Channel; PDCCH), a multicast channel (Physical Multicast Channel; PMCH), a control format indicator channel (Physical Control Format Indicator Channel; PCFICH), and an HARQ indicator channel (Physical Hybrid ARQ Indicator Channel; PHICH).

In the embodiment, an uplink from the mobile station apparatus 2 to the base station apparatus 1 includes an uplink pilot channel (or referred to as an Uplink Reference Signal (UL RS)), an uplink control channel (PUCCH), an uplink shared channel (PUSCH), and a random access channel (PRACH; Physical Random Access Channel).

(Frequency Band Aggregation)

Figure 2:
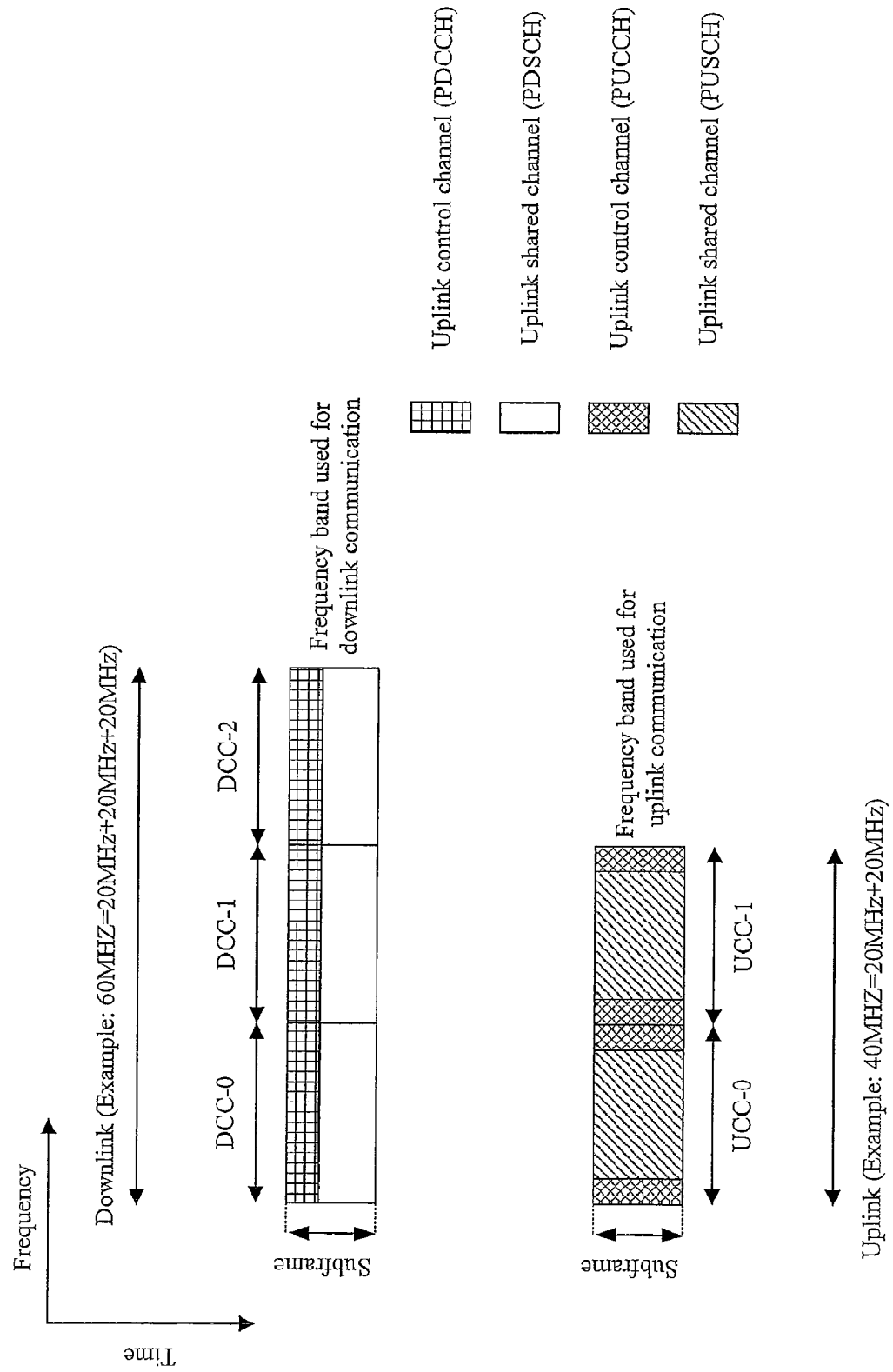
FIG. 2 is a diagram showing an example of frequency band aggregation processing in the embodiment.

FIG. 2 is a diagram showing an example of frequency band aggregation in the embodiment. In FIG. 2, the horizontal axis represents a frequency domain, and the vertical axis represents a time domain. As shown in FIG. 2, the downlink (upper portion of the figure) is constituted of three carrier components having a bandwidth of 20 MHz (DCC-0: Downlink Component Carrier-0, DCC-1, and DCC-2). In contrast, the uplink (lower portion of the figure) is constituted of two carrier components having a bandwidth of 20 MHz (UCC-0: Uplink Component Carrier-0 and UCC-1). In a radio communication system in FIG. 2, the base station apparatus and the mobile station apparatuses are capable of transmitting and receiving (up to) three downlink data pieces in a single subframe by using the three carrier components in the downlink and of transmitting and receiving (up to) two uplink data pieces in a single subframe by using the two carrier components in the uplink.

(Uplink Radio Frame)

Figure 3:
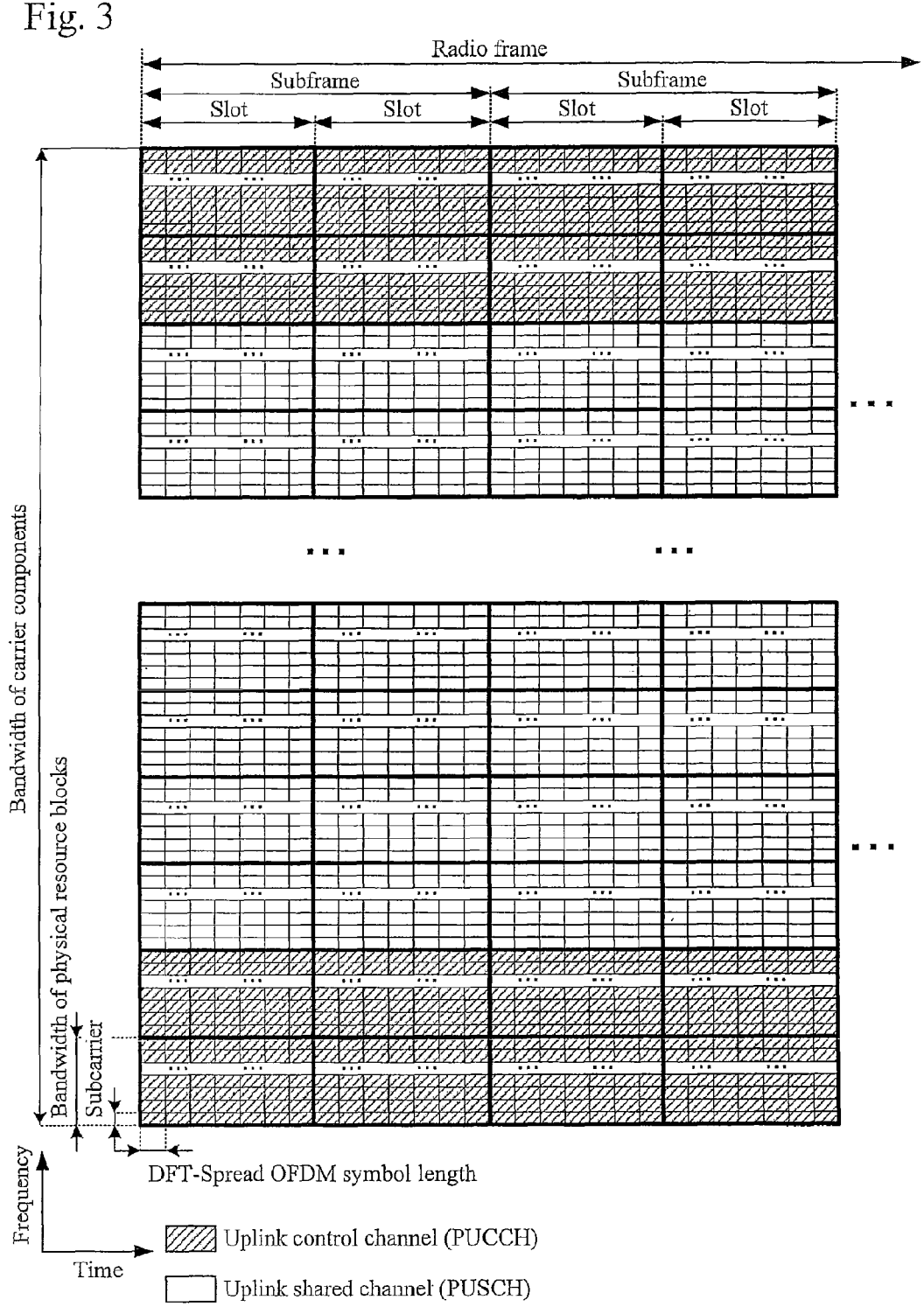
FIG. 3 is a diagram showing a schematic configuration example of a downlink radio frame in the embodiment.

FIG. 3 is a diagram showing a schematic configuration example of a radio frame of uplink carrier components in the embodiment. In FIG. 3, the horizontal axis represents the time domain, and the vertical axis represents the frequency domain. The radio frame of the uplink carrier components is constituted of multiple pairs of physical resource blocks (PRB). The pairs of physical resource blocks (PRBs) are units for radio resource allocation and the like and are each constituted of a frequency band (PRB bandwidth) and a time slot (2 slots=1 subframe) of predetermined widths.

Basically, one pair of physical resource blocks (PRBs) is constituted of two physical resource blocks (PRBs) which are contiguous in the time domain (PRB bandwidth×slots). As shown in FIG. 2, each physical resource block (PRB) (a unit surrounded in a bold line in FIG. 3) is constituted of 12 subcarriers in the frequency domain and by seven DFT-Spread OFDM symbols in the time domain.

In the time domain, there are slots each constituted of seven DFT-Spread OFDM symbols, subframes each constituted of two slots, and the radio frames each constituted of ten subframes. In the frequency domain, multiple physical resource blocks (PRBs) according to bandwidth of the uplink carrier components are arranged. The bandwidth of each uplink carrier component is broadcasted by the base station apparatus by using the downlink shared channel (PDSCH). Note that a unit formed by one subcarrier and one DFT-Spread OFDM symbol is referred to as a resource element (RE).

At least the uplink control channel (PUCCH), the uplink shared channel (PUSCH), and the uplink pilot channel used for estimating a propagation path for the uplink shared channel (PUSCH) and the uplink control channel (PUCCH) are arranged in each uplink subframe. Note that the uplink control channel (PUCCH) is arranged from a pair of physical resource blocks PRBs at either end of the bandwidth of the carrier component in the subframe, and the uplink shared channel (PUSCH) is arranged in any of the remaining pairs of physical resource blocks (PRBs). The mobile station apparatus does not transmit the uplink control channel (PUCCH) and the uplink shared channel (PUSCH) altogether. Although illustration of the uplink pilot channel will be omitted in FIG. 3 for simplicity of explanation, the uplink pilot channel is time-multiplexed with the uplink shared channel (PUSCH) and the uplink control channel (PUCCH). Illustration of the random access channel (PRACH) will be omitted in FIG. 3 for simplicity of explanation.

In the uplink shared channel (PUSCH), data (transport block) is transmitted. In the uplink control channel (PUCCH), uplink control information (UCI) is transmitted, such as a channel quality indicator (CQI), a scheduling request indicator (SRI), an acknowledgement (ACK)/negative-acknowledgement (NACK).

(Downlink Radio Frame)

Figure 4:
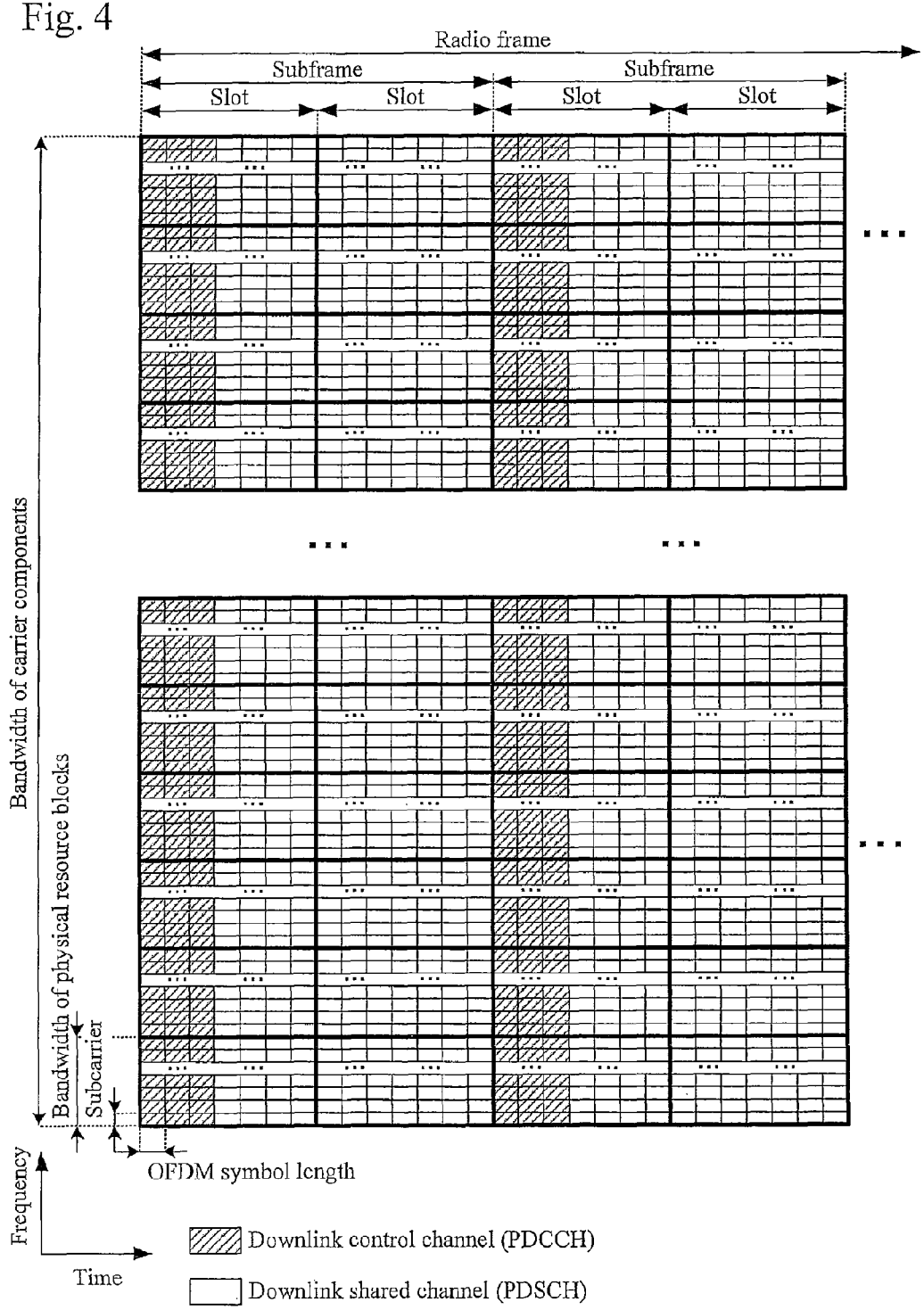
FIG. 4 is a diagram showing a schematic configuration example of an uplink radio frame in the embodiment.

FIG. 4 is a diagram showing a schematic configuration example of a radio frame of downlink carrier components in the embodiment. In FIG. 4, the horizontal axis represents the time domain, and the vertical axis represents the frequency domain. The radio frame of the downlink carrier components is constituted of multiple pairs of physical resource blocks (PRB). The pairs of physical resource blocks (PRBs) are units for radio resource allocation and the like and are each constituted of a frequency band (PRB bandwidth) and a time slot (2 slots=1 subframe) of predetermined widths. One pair of physical resource blocks (PRBs) is constituted of two physical resource blocks (PRBs) which are contiguous in the time domain (PRB bandwidth×slots). As shown in FIG. 2, each physical resource block (PRB) (a unit surrounded in a bold line in FIG. 3) is constituted of 12 subcarriers in the frequency domain and by seven OFDM symbols in the time domain.

In the time domain, there are slots each constituted of seven OFDM symbols, subframes each constituted of two slots, and the radio frames each constituted of ten subframes. In the frequency domain, multiple physical resource blocks (PRBs) according to bandwidth of the downlink carrier components are arranged. A unit formed by the one subcarrier and the one OFDM symbol is referred to as a resource element.

At least the downlink control channel (PDCCH), the downlink shared channel (PDSCH), and the downlink pilot channel used for estimating a propagation path for the downlink shared channel (PDSCH) and the downlink control channel (PDCCH) are arranged in each uplink subframe. The downlink control channel (PDCCH) is arranged from the top OFDM symbol in the subframe, and the downlink shared channel (PDSCH) is arranged in the remaining OFDM symbols. Illustration of the downlink pilot channel is omitted in FIG. 4 for simplicity of explanation, but the downlink pilot channel is arranged in a dispersed manner in the frequency domain and the time domain. Illustration of the broadcast channel (PBCH), the multicast channel (PMCH), the control format indicator channel (PCFICH), and the HARQ indicator channel (PHICH) will be omitted in FIG. 4 for simplicity of explanation.

In the downlink shared channel (PDSCH), data (transport block) is transmitted. In the downlink control channel (PDCCH), downlink control information (DCI) is transmitted, such as the uplink grant and the downlink grant, the uplink grant being constituted of information indicating a modulation scheme, information indicating a coding scheme, information indicating radio resource allocation (RA), information on an HARQ for the uplink shared channel (PUSCH), and the like, the downlink grant being constituted of information indicating a modulation scheme information indicating a coding method, information indicating radio resource allocation, information on an HARQ for the downlink shared channel (PDSCH), and the like.

The downlink shared channel (PDSCH) whose radio resource allocation is indicated by the downlink grant is arranged in the same subframe in which the downlink control channel (PDCCH) including the downlink grant information is arranged. The uplink shared channel (PUSCH) in an uplink carrier component allocated by the uplink grant is arranged in a subframe following, at a predetermined-later-time location, a subframe which includes the uplink grant information and in which the downlink control channel is arranged. In radio resource allocation for the uplink and the downlink by the downlink control channel (PDCCH), the mobile station apparatus identifies the downlink control channel (PDCCH) addressed thereto by using the 16-bit mobile station identify (RNTI) which is uniquely identifiable in the base station apparatus. The uplink grant and the downlink grant are generated for each of the uplink and downlink carrier components to which radio resources for the uplink shared channel (PUSCH) and the downlink shared channel (PDSCH) are allocated.

The base station apparatus sets up downlink carrier components forming UE specific search spaces (USSs) for monitoring downlink control information (DCI) by the mobile station apparatus. Each of the UE specific search space (USS) is formed based on a mobile station identity (RNTI) allocated to the mobile station apparatus, in the corresponding downlink carrier component set by the base station apparatus.

Note that "monitoring" described in the embodiment is to demodulate and decode and error detect a reception signal and to detect the downlink control channel, by the mobile station apparatus, concerning a downlink control channel candidate (PDCCH candidate) being a radio resource in which the downlink control channel (PDCCH) might be arranged.

In FIG. 2, for example, the base station apparatus sets up the DCC-1, for a certain mobile station apparatus, as a downlink carrier component forming the UE specific search space (USS) for monitoring the downlink control information (DCI) by the mobile station apparatus. At this time, the mobile station apparatus monitors the UE specific search space (USS) in the DCC-1 for the downlink control information (DCI).

A UE specific search space (USS) is constituted of multiple control channel elements (CCEs). Each of the control channel elements (CCEs) is formed by multiple resource element groups (REGs, or referred to as mini-CCEs) dispersed in the frequency and time domains. Each of the resource element groups (REGs) is constituted of four downlink resource elements contiguous in the frequency domain except the downlink pilot channel in the frequency domain having the same OFDM symbols as that of the downlink control channel (PDCCH).

Meanwhile, the downlink control information (DCI) is arranged in any of downlink control channel candidates each constituted of one or more control channel elements (CCEs). For example, a downlink control channel candidate forming a UE specific search space (USS) is constituted of one, two, four or eight control channel elements (CCEs). In addition, each of UE specific search spaces (USSs) is formed, and the number of the UE specific search spaces (USSs) is the same as the number of uplink and downlink carrier components allocated to the mobile station apparatus concerning each number of control channel elements (CCEs) which constitute a downlink control channel candidate.

Figure 5:
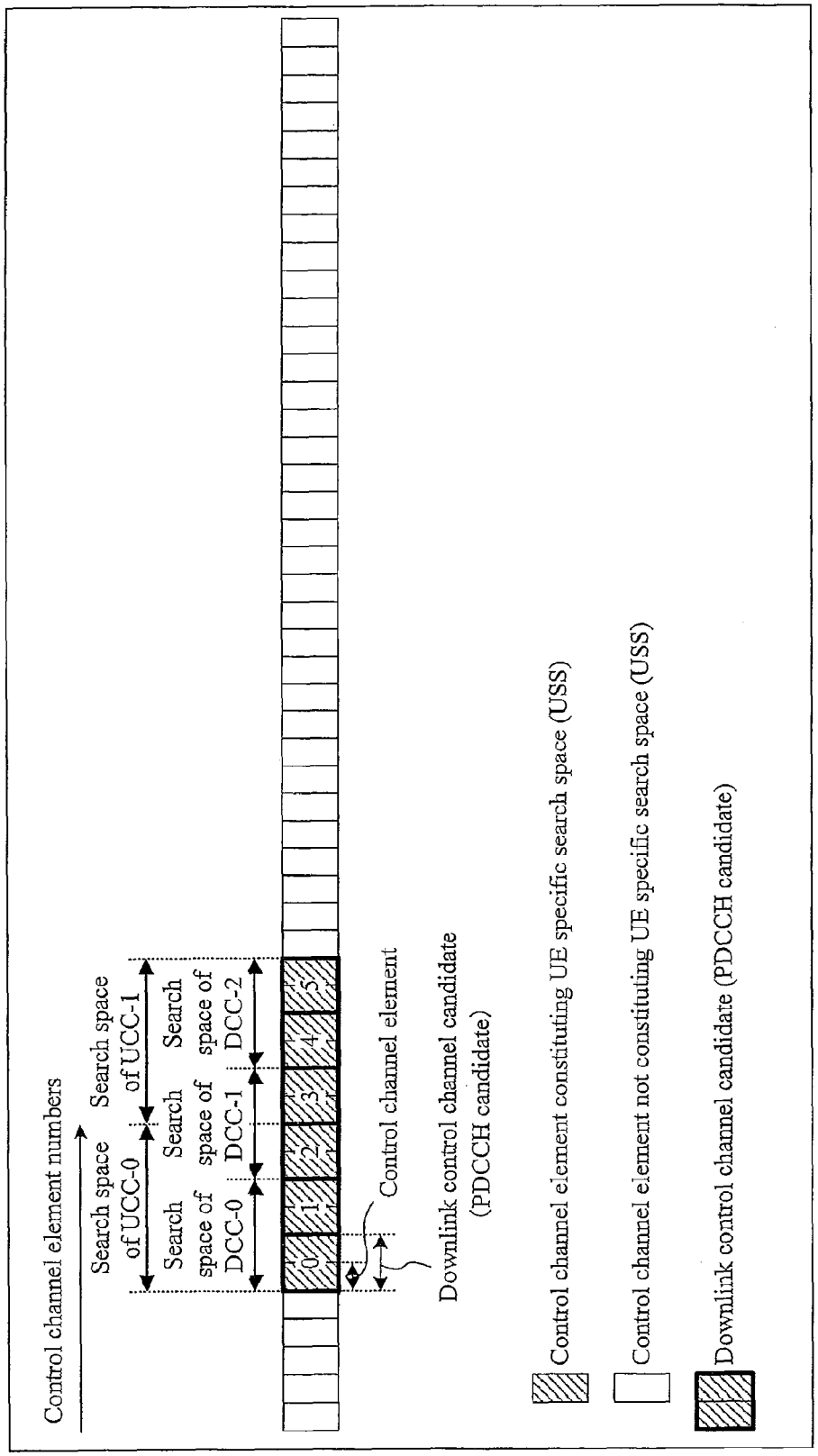
FIG. 5 is a diagram showing an example of UE specific search spaces (USSs) in the embodiment.

FIG. 5 is a diagram showing an example of UE specific search spaces (USSs) in the embodiment. FIG. 5 shows as an example only UE specific search spaces (USSs) for downlink control channel candidates each constituted of two control channel elements (CCEs) among UE specific search spaces (USSs) of a mobile station apparatus allocated carrier components as in FIG. 2. The horizontal axis in FIG. 5 represents a number for identifying each control channel element (CCE). Hatched squares in FIG. 5 represent control channel elements (CCEs) constituting the UE specific search spaces (USSs). Outlined squares in FIG. 5 represent control channel elements (CCEs) not constituting the UE specific search spaces (USSs). Units each for the two control channel elements (CCEs) surrounded in a bold line in FIG. 5 represent a downlink control channel candidates. Numbers assigned to the downlink control channel candidate in FIG. 5 are numbers for identifying the downlink control channel candidates. The numbers are assigned from 0 to the downlink control channel candidates each constituted of the same number of control channel elements in the UE specific search spaces (USSs).

In FIG. 5, a UE specific search space (USS) of DCC-0 is constituted of downlink control channel candidates assigned "0" and "1." A UE specific search space (USS) of DCC-1 is constituted of downlink control channel candidates assigned "2" and "3." A UE specific search space (USS) of DCC-2 is constituted of downlink control channel candidates assigned "4" and "5." A UE specific search space (USS) of UCC-0 is constituted of downlink control channel candidates assigned "0", "1" and "2." A UE specific search space (USS) of UCC-1 is constituted of downlink control channel candidates assigned "3", "4" and "5."

Specifically, the six downlink control channel candidates assigned "0" to "5" are evenly divided by the number of the uplink carrier components or the downlink carrier components which are allocated to the mobile station apparatus, and thereby a UE specific search space (USS) corresponding to each uplink or downlink carrier component is formed. To put it differently, a region of search spaces is controlled so that the number of downlink control channel candidates each constituting a UE specific search space (USS) can vary with the number of uplink or downlink carrier components allocated to the mobile station apparatus.

Hence, the base station apparatus 1 includes a search space/carrier component associating unit 5a which associates each of multiple UE specific search spaces (USSs) where the mobile station apparatus is to detect a downlink control channel, with a carrier component controlled with downlink control information (DCI) addressed to the mobile station apparatus and transmitted in a downlink control channel (PDCCH). In addition, the mobile station apparatus 2 includes a carrier component identifying unit 53a which identifies a carrier component controlled with the downlink control information (DCI) addressed to the mobile station apparatus and transmitted in the downlink control channel (PDCCH) based on a UE specific search space (USS) in which the downlink control channel (PDCCH) detected by a downlink control channel detector 67.

Downlink grants are arranged in the UE specific search space (USS) of DCC-0, the UE specific search space (USS) of DCC-1, and the UE specific search space (USS) of DCC-2, while uplink grants are arranged in a UE specific search space (USS) of UCC-0 and a UE specific search space (USS) of UCC-1. The uplink grants and the downlink grants are identified based on a scheme of decoding processing or identities.

In an example shown in FIG. 5, an example is shown in which the carrier components are associated in turn from a carrier component having the smallest number for identifying each downlink control channel candidate. However, each carrier component may be associated with the numbers for identifying downlink control channel candidates by another method. For example, each number for identifying the downlink control channel candidates may be divided by the number of the carrier components, and thereby a corresponding downlink control channel candidate may be determined based on a remainder. In other words, in FIG. 5, the number for identifying a downlink control channel candidate is divided by the number of downlink carrier components. A downlink control channel candidate having a remainder of 0 is associated with DCC-0. A downlink control channel candidate having a remainder of 1 is associated with DCC-1. A downlink control channel candidate having a remainder of 2 is associated with DCC-2. In addition, the number for identifying an uplink control channel candidate is divided by the number of uplink carrier components. An uplink control channel candidate having a remainder of 0 is associated with UCC-0. An uplink control channel candidate having a remainder of 1 is associated with UCC-1.

(Configuration of Base Station Apparatus)

Figure 6:
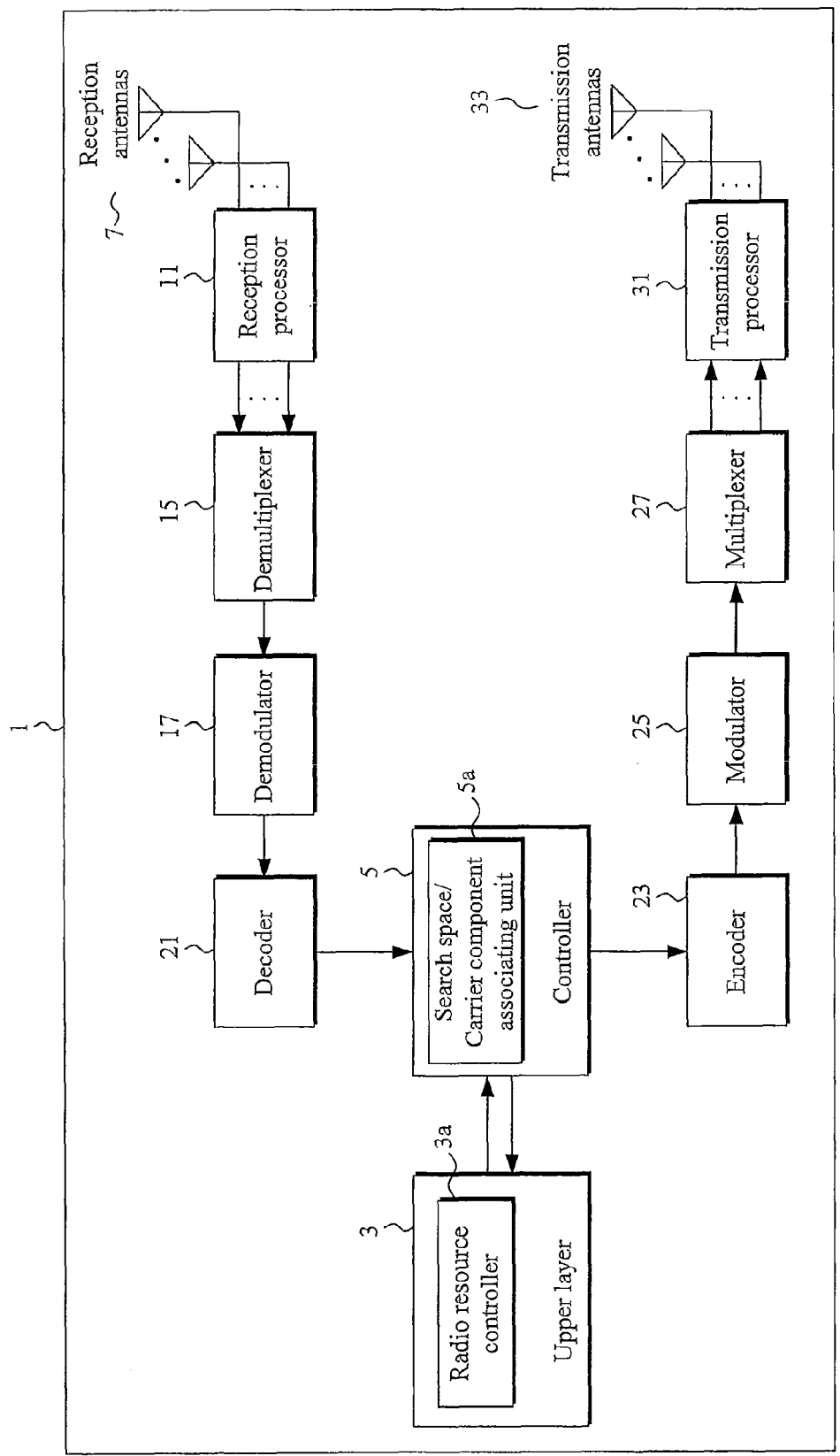
FIG. 6 is a functional block diagram showing a configuration example of a base station apparatus in the embodiment.

FIG. 6 is a functional block diagram showing a configuration example of the base station apparatus 1 in the embodiment. As shown in FIG. 6, the base station apparatus 1 includes an higher layer 3, a controller 5, reception antennas 7, a reception processor 11, a demultiplexer 15, a demodulator 17, a decoder 21, an encoder 23, a modulator 25, a multiplexer 27, a transmission processor 31, and transmission antennas 33. In the base station apparatus 1, the encoder 23, the modulator 25, the multiplexer 27, the transmission processor 31, the controller 5, the higher layer 3, and the transmission antennas 33 constitute a transmitter. In the base station apparatus 1, the decoder 21, the demodulator 17, the demultiplexer 15, the reception processor 11, the controller 5, the higher layer 3, and the reception antennas 7 constitute a receiver.

The encoder 23 acquires from the controller 5 data transmitted in a downlink shared channel (PDSCH), generates a cyclic redundancy check (CRC) code from the data acquired from the controller 5, and adds the cyclic redundancy check (CRC) code to the data. Then, the encoder 23 performs error correction encoding on the data including the cyclic redundancy check (CRC) code added thereto, based on a control signal inputted from the controller 5, by using a turbo code to output the data to the modulator 25.

The encoder 23 also acquires from the controller 5 downlink control information transmitted in a downlink control channel (PDCCH), generates a cyclic redundancy check (CRC) code from the downlink control information (DCI) acquired from the controller 5, and adds a sequence to the downlink control information (DCI), the sequence obtained by exclusively ORing a mobile station identity (RNTI) allocated to the mobile station apparatus to transmit the downlink control channel (PDCCH) and the cyclic redundancy check (CRC). Then, the encoder performs error correction encoding on the downlink control information (DCI) including the cyclic redundancy check (CRC) code added thereto, based on a control signal inputted from the controller, by using a convolutional code of predetermined coding ratio. The encoder also performs rate matching on bits, that is, thinning the bits down or copying the bits, so as to adjust the number of bits of the downlink control information (DCI) subjected to the error correction encoding to a predetermined number of bits, and then outputs the downlink control information (DCI) to the modulator 25.

Based on a control signal from the controller 5, the modulator 25 modulates the coded bits inputted from the encoder 23 and subjected to the error correction encoding, by using a modulation scheme such as quadrature phase shift keying (QPSK), 16 quadrature amplitude modulation (16QAM), or 64 quadrature amplitude modulation (64QAM), generates a modulation symbol, and outputs the modulation symbol to the multiplexer 27.

Based on a control signal from the controller 5, the multiplexer 27 multiplexes the modulation symbol inputted from the modulator 25 in resource elements in a downlink subframe and outputs the modulation symbols to the transmission processor 31. At this time, based on a control signal from the controller 5, the multiplexer 27 multiplexes the signal of the downlink control channel (PDCCH) in resource elements constituting a UE specific search space (USS) associated with a carrier component to which a radio resource is allocated by the downlink control information (DCI). Note that the search space/carrier component associating unit 5a in the controller 5 associates the carrier component and the search space (SS) but details will be described later.

Based on a control signal from the controller 5, the transmission processor 31 performs an inverse fast Fourier transform (IFFT) on the modulation symbols inputted from the multiplexer 27 to perform modulation based on an OFDM scheme, adds a guard interval (GI) to each of the OFDM-modulated OFDM symbols, generates a digital symbol for the baseband, converts the digital signal for the baseband into an analog signal, generates an in-phase component and an orthogonal component of an intermediate frequency from the analog signal, eliminates frequency components unnecessary for the intermediate frequency band, up-converts an intermediate-frequency signal into a high-frequency signal, eliminates unnecessary frequency components, amplifies the power, outputs the signal to a corresponding one of the transmission antennas 33, and then transmits the signal.

Based on a control signal from the controller 5, the reception processor 11 amplifies a signal received through a corresponding one of the reception antennas 7, down-converts the signal into the intermediate-frequency signal, eliminates unnecessary frequency components, controls the amplitude level so that the signal level can be maintained appropriately, performs quadrature demodulation on the basis of an in-phase component and an orthogonal component of the received signal, converts the analog signal subjected to the quadrature demodulation into a digital signal, eliminates a portion corresponding to a guard interval from the digital signal, performs a fast Fourier transform on the signal from which the guard interval is eliminated, and performs demodulation using the DFT-Spread OFDM scheme.

Based on a control signal from the controller 5, the demultiplexer 15 extracts reception signals of an uplink control channel (PUCCH), an uplink shared channel (PUSCH), and an uplink pilot channel from resource elements for the reception signals demodulated by the reception processor 11 using the DFT-Spread OFDM scheme. The demultiplexer 15 performs propagation path compensation on the reception signals of the uplink control channel (PUCCH) and the uplink shared channel (PUSCH) by using the reception signal of the uplink pilot channel, performs an inverse discrete Fourier transform (IDFT) on the reception signals, and outputs the reception signals to the demodulator 17.

Based on a control signal from the controller 5, the demodulator 17 demodulates the reception signals of the uplink control channel (PUCCH) and the uplink shared channel (PUSCH) which are inputted from the demultiplexer 15, by using the demodulation scheme such as the QPSK, the 16QAM or the 64QAM, and outputs the reception bits to the decoder 21.

Based on a control signal from the controller 5, the decoder 21 performs error correction decoding such as turbo decoding or majority-decision decoding on the reception bits of the uplink control channel (PUCCH) and the uplink shared channel (PUSCH) which are inputted from the demultiplexer 15 and outputs the reception bits to the controller 5.

The higher layer 3 performs processing for a packet data convergence protocol (PDCP) layer, a radio link control (RLC) layer, and a radio resource control (RRC) layer. The higher layer 3 outputs to the controller 5 information to be transmitted to the mobile station apparatus in channels in the downlink, thus outputting a control signal for controlling the controller 5.

The higher layer 3 includes a radio resource controller 3a. The radio resource controller 3a performs management of various setting information of uplink and downlink carrier components allocated to the mobile station apparatus and downlink carrier components constituting UE specific search spaces (USSs) for monitoring downlink control information (DCI) by the mobile station apparatus, management of communication states of the mobile station apparatuses, management of a buffer state of each mobile station apparatus, management of mobile station identities (RNTIs) and the like.

The radio resource controller 3a outputs the information managed by the radio resource controller 3a to the controller 5 as necessary.

The controller 5 performs scheduling (such as an HARQ process) for the downlink and the uplink. The controller 5 outputs control signals to the processing units for controlling the reception processor 11, the demultiplexer 15, the demodulator 17, the decoder 21, the encoder 23, the modulator 25, the multiplexer 27, and the transmission processor 31, although illustration thereof is omitted in FIG. 6. The controller 5 performs radio resource allocation to channels in the uplink and the downlink, selection processing of the modulation scheme and the coding scheme, retransmission control in the HARQ process, and generation of control signals to be used for controlling the processing units on the basis of control signals inputted from the higher layer 3 and information managed by the radio resource controller. The controller 5 also generates the downlink control information (DCI) indicating radio resource allocation, the selection processing of the modulation scheme and coding scheme, and the result of the retransmission control in an HARQ for the uplink shared channel (PUSCH) and the downlink shared channel (PDSCH).

In addition, the controller 5 includes the search space (SS)/carrier component associating unit. The search space (SS)/carrier component associating unit 5a acquires from the radio resource controller 3a setting information of uplink and downlink carrier components allocated to the mobile station apparatus and downlink carrier components constituting UE specific search spaces (USSs). Then, the search space (SS)/carrier component associating unit 5a divides the UE specific search spaces (USSs) for monitoring and detecting the downlink control channel (PDCCH) by the mobile station apparatus, by the number of the uplink carrier components or the number of the downlink carrier components. In other words, the region of the search spaces is controlled so that the number of downlink control channel candidates in each UE specific search space (USS) as a result of division by the search space (SS)/carrier component associating unit can vary with the number of the uplink carrier components or the number of the downlink carrier components which are allocated to the mobile station apparatus. Since the number of downlink control channel candidates constituting UE specific search spaces (USS) is constant in this embodiment, the control is performed so that the region of each UE specific search space (USS) can be made smaller as the number of the uplink or downlink carrier components associated by the search space (SS)/carrier component associating unit 5a is increased, and so that the region of each UE specific search spaces (USS) can be made larger as the number of the associated uplink or downlink carrier components is decreased.

Further, the search space (SS)/carrier component associating unit 5a associates the carrier components controlled with the downlink control information (DCI) with the respective multiple divided UE specific search spaces (USSs), the downlink control information (DCI) being transmitted in the downlink control channel (PDCCH) and addressed to the mobile station apparatus. The search space (SS)/carrier component associating unit outputs control signals by which the multiplexer 27 is controlled so that the downlink control channel (PDCCH) can be arranged in a UE specific search space (USS) associated with the carrier component controlled with the downlink control information (DCI) transmitted in the downlink control channel (PDCCH) and addressed to the mobile station apparatus.

Moreover, the controller 5 outputs to the encoder 23 information inputted from the higher layer 3 and to be transmitted in the downlink. The controller 5 also processes, as necessary, the information inputted from the decoder 21 and acquired in the uplink, and then outputs the information to the higher layer 3.

(Configuration of Mobile Station Apparatus)

Figure 7:
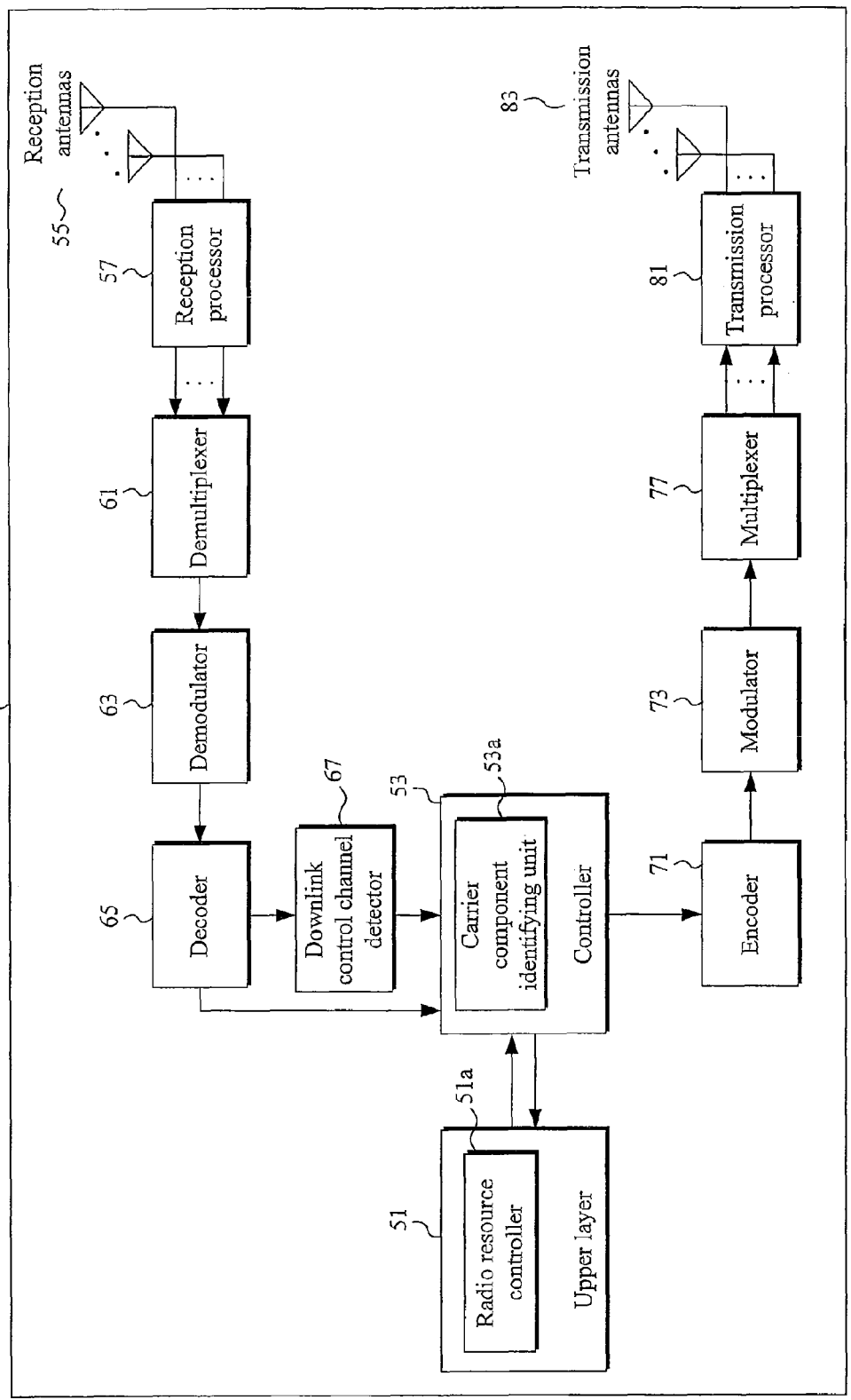
FIG. 7 is a functional block diagram showing a configuration example of a mobile station apparatus in the embodiment.

FIG. 7 is a functional block diagram showing a configuration example of the mobile station apparatus 2 in the embodiment. As shown in FIG. 7, the base station apparatus 2 includes an higher layer 51, a controller 53, reception antennas 55, a reception processor 57, a demultiplexer 61, a demodulator 63, a decoder 65, a downlink control channel (PDCCH) detector 67, an encoder 71, a modulator 73, a multiplexer 77, a transmission processor 81, and transmission antennas 83. In the mobile station apparatus 2, the encoder 71, the modulator 73, the multiplexer 77, the transmission processor 81, the controller 53, the higher layer 51, and the transmission antennas 83 constitute a transmitter. In the mobile station apparatus 2, downlink control channel (PDCCH) detector 67, the decoder 65, the demodulator 63, the demultiplexer 61, the reception processor 57, the controller 53, the higher layer 51, and the reception antennas 55 constitute a receiver.

The encoder 71 acquires from the controller 53 data transmitted in each uplink channel, generates a cyclic redundancy check (CRC) code from the data to be transmitted in the uplink shared channel (PUSCH), and adds the cyclic redundancy check (CRC) code to the data. Then, the encoder 71 performs error correction encoding on the data including the cyclic redundancy check (CRC) code added thereto and the data to be transmitted in the uplink control channel (PUCCH), based on a control signal inputted from the controller 53, by using a turbo code or a Reed Muller code to output the data to the modulator 73.

Based on a control signal from the controller 53, the modulator 73 modulates the coded bits inputted from the encoder 71 and subjected to the error correction encoding, by using a modulation scheme such as QPSK, 16QAM, or 64QAM, generates a modulation symbol, and outputs the modulation symbol to the multiplexer 77.

Based on a control signal from the controller 53, the multiplexer 77 performs a discrete Fourier transform on the modulation symbol inputted from the modulator 73, multiples the symbols in resource elements in an uplink subframe, and outputs the modulation symbols to the transmission processor 81.

Based on a control signal from the controller 53, the transmission processor 81 performs an inverse fast Fourier transform (IFFT) on the modulation symbols inputted from the multiplexer 77 to perform modulation based on a DFT-Spread OFDM scheme, adds a guard interval to each of the DFT-Spread OFDM-modulated DFT-Spread OFDM symbols, generates a digital symbol for the baseband, converts the digital signal for the baseband into an analog signal, generates an in-phase component and an orthogonal component of an intermediate frequency from the analog signal, eliminates frequency components unnecessary for the intermediate frequency band, up-converts an intermediate-frequency signal into a high-frequency signal, eliminates unnecessary frequency components, amplifies the power, outputs the signal to a corresponding one of the transmission antennas 83, and then transmits the signal.

Based on a control signal from the controller 53, the reception processor 57 amplifies a signal received through a corresponding one of the reception antennas 55, down-converts the signal into the intermediate-frequency signal, eliminates unnecessary frequency components, controls the amplitude level so that the signal level can be maintained appropriately, performs quadrature demodulation on the basis of an in-phase component and an orthogonal component of the received signal, converts the analog signal subjected to the quadrature demodulation into a digital signal, eliminates a portion corresponding to a guard interval from the digital signal, performs a fast Fourier transform on the signal from which the guard interval is eliminated, and performs demodulation using the OFDM scheme.

Based on a control signal from the controller 53, the demultiplexer 61 extracts reception signals of a downlink control channel (PDCCH), a downlink shared channel (PDSCH), and a downlink pilot channel from resource elements for the reception signals demodulated by the reception processor 57 using the OFDM scheme. The demultiplexer 15 performs propagation path compensation on the reception signals of the downlink control channel (PDCCH) and the downlink shared channel (PDSCH) by using the reception signal of the downlink pilot channel and outputs the reception signals to the demodulator.

Based on a control signal from the controller 53, the demodulator 63 demodulates the reception signals of the downlink control channel (PDCCH) and the downlink shared channel (PDSCH) which are inputted from the demultiplexer 61, by using the demodulation scheme such as the QPSK, the 16QAM or the 64QAM, and outputs the demodulation bits to the decoder 65.

Based on a control signal from the controller 53, the decoder 65 performs error correction decoding such as turbo decoding or majority-decision decoding on the demodulation bits of the downlink control channel (PDCCH) and the downlink shared channel (PDSCH) which are inputted from the demultiplexer 63 and outputs the decode data to the controller 53. Based on a control signal from the controller 53, the decoder 65 performs rate de-matching for the demodulation bits of the downlink control channel (PDCCH) inputted from the demodulator 63 on each of the downlink control channel candidates in the multiple UE specific search spaces (USSs) for monitoring the downlink control channel (PDCCH) by the mobile station apparatus, performs error correction decoding, and outputs the bits to the downlink control channel detector 67.

Based on a control signal from the controller 53, the downlink control channel detector 67 exclusively ORes a mobile station identity (RNTI) allocated to the mobile station apparatus by the base station apparatus and the sequence obtained by exclusively ORing, by the base station apparatus, the mobile station identity (RNTI) and the cyclic redundancy check (CRC) which are added to each downlink control channel candidate in the multiple UE specific search spaces (USSs) inputted by the decoder 65. Thereby, the downlink control channel detector 67 acquires a cyclic redundancy check (CRC) code and then performs error detection. If no error is detected in the error detection using the cyclic redundancy check (CRC) code, the downlink control channel detector 67 considers the detection of the downlink control channel (PDCCH) to have succeeded, and outputs to the controller 53 the downlink control information (DCI) transmitted in the downlink control channel (PDCCH) and a number for identifying the downlink control channel candidate in which the downlink control channel (PDCCH) is arranged.

The higher layer 51 performs processing for a packet data convergence protocol (PDCP) layer, a radio link control (RLC) layer, and a radio resource control (RRC) layer. The higher layer 51 outputs a signal to control the controller 53. The higher layer 51 includes a radio resource controller 51a. The radio resource controller 51a performs management of various setting information of a carrier component allocated by the base station apparatus and downlink carrier components constituting UE specific search spaces (USSs) for monitoring downlink control information (DCI), management of communication state and a buffer state of the own station apparatuses, management of mobile station identities (RNTIs) and the like. The radio resource controller 51*a* outputs the information managed by the radio resource controller 51*a* to the controller 53 as necessary. The higher layer 51 also performs cyclic redundancy check (CRC) by using the cyclic redundancy check (CRC) code added to the downlink shared channel (PDSCH) and performs error detection on the data transmitted by using the downlink shared channel (PDSCH) by the base station apparatus. The higher layer 51 generates an acknowledgement (ACK) or a negative-acknowledgement (NACK) as an error detection result of the cyclic redundancy check (CRC) of the downlink shared channel (PDSCH), and outputs the acknowledgement (ACK) or the negative-acknowledgement (NACK) to the controller.

The controller 53 performs scheduling (such as an HARQ process) for the downlink and the uplink. The controller 53 outputs control signals to the processing units for controlling the reception processor 57, the demultiplexer 61, the demodulator 63, the decoder 65, the downlink control channel (PDCCH) detector 67, the encoder 71, the modulator 73, the multiplexer 77, and the transmission processor 81, although illustration thereof is omitted in FIG. 7. The controller 53 performs radio resource allocation to channels in the uplink and the downlink, selection processing of the modulation scheme and the coding scheme, retransmission control in the HARQ process, and generation of control signals to be used for controlling the processing units on the basis of control signals inputted from the higher layer 51, the downlink control information (DCI) inputted from the downlink control channel (PDCCH) detector 67, and the like.

Meanwhile, the controller 53 includes the carrier component identifying unit 53*a*. The carrier component identifying unit 53*a* acquires from the radio resource controller 51*a* the various setting information of carrier components allocated by the base station apparatus, downlink carrier components constituting UE specific search spaces (USSs) for monitoring the downlink control information (DCI), and the like, and recognizes carrier components corresponding to respective UE specific search spaces (USSs) divided by the base station apparatus. Since the number of downlink control channel candidates constituting the UE specific search spaces (USSs) is constant, the region of each UE specific search space (USS) is controlled so that the number of the downlink control channel candidates in the UE specific search spaces (USS) recognized by the carrier component identifying unit can vary with the number of the uplink carrier components or the number of the downlink carrier components to which the mobile station apparatus is allocated. Since the number of downlink control channel candidates constituting UE specific search spaces (USS) is constant in this embodiment, the carrier component identifying unit 53*a* performs control so that the region of each UE specific search space (USS) where the downlink control channel detector 67 is to detect the downlink control channel (PDCCH) can be made smaller as the number of the uplink or downlink carrier components associated to the own station apparatus is increased, and so that the region of each UE specific search spaces (USS) where the downlink control channel detector 67 is to detect the downlink control channel (PDCCH) can be made smaller as the number of the uplink or downlink carrier components associated to the own station apparatus is decreased.

Further, from the number for identifying a downlink control channel candidate in which the downlink control channel (PDCCH) inputted from the downlink control channel detector 67 is arranged, the carrier component identifying unit 53*a* identifies a carrier component controlled with the downlink control information (DCI) transmitted in the downlink control channel (PDCCH), and outputs the downlink control information (DCI) and the information on the carrier component controlled with the downlink control information (DCI) to the controller 53.

For example, in FIG. 5, if the numbers for identifying downlink control channel candidates in which a downlink grant inputted from the downlink control channel detector 67 is arranged are 0 and 1, the carrier component identifying unit 53*a* identifies a carrier component controlled with the downlink grant as DCC-0. In addition, if the numbers for identifying downlink control channel candidates are 2 and 3, the carrier component identifying unit 53*a* identifies a carrier component controlled with the downlink grant as DCC-1, and if the numbers for identifying downlink control channel candidates are 4 and 5, the carrier component identifying unit 53*a* identifies a carrier component controlled with the downlink grant as DCC-2.

Alternatively, if the numbers for identifying a downlink control channel candidates in which an uplink grant inputted from the downlink control channel detector 67 is arranged are 0, 1 and 2, the carrier component identifying unit 53*a* identifies a carrier component controlled with the uplink grant as UCC-0, and if the numbers for identifying downlink control channel candidates are 3, 4, and 5, the carrier component identifying unit 53*a* identifies a carrier component controlled with the uplink grant as UCC-1.

The controller 53 also outputs data inputted from the higher layer 51 and to be transmitted in the uplink to the encoder 71. In addition, the controller 53 processes, as necessary, the information inputted from the decoder 65 and acquired in the downlink and then outputs the information to the higher layer 51.

The configuration of the mobile station apparatus of the present invention has been heretofore described. However, the downlink control channel detector 67 may output the (lowest) number for identifying a control channel element in which a downlink control channel (PDCCH) is arranged to the controller 53, and the carrier component identifying unit 53*a* may thus identify a carrier component controlled with the downlink control information (DCI) transmitted in the downlink control channel (PDCCH), from the (lowest) number inputted from the downlink control channel detector 67 for identifying the control channel element in which the downlink control channel (PDCCH) is arranged.

(Processing flow in Base Station Apparatus)

Figure 8:
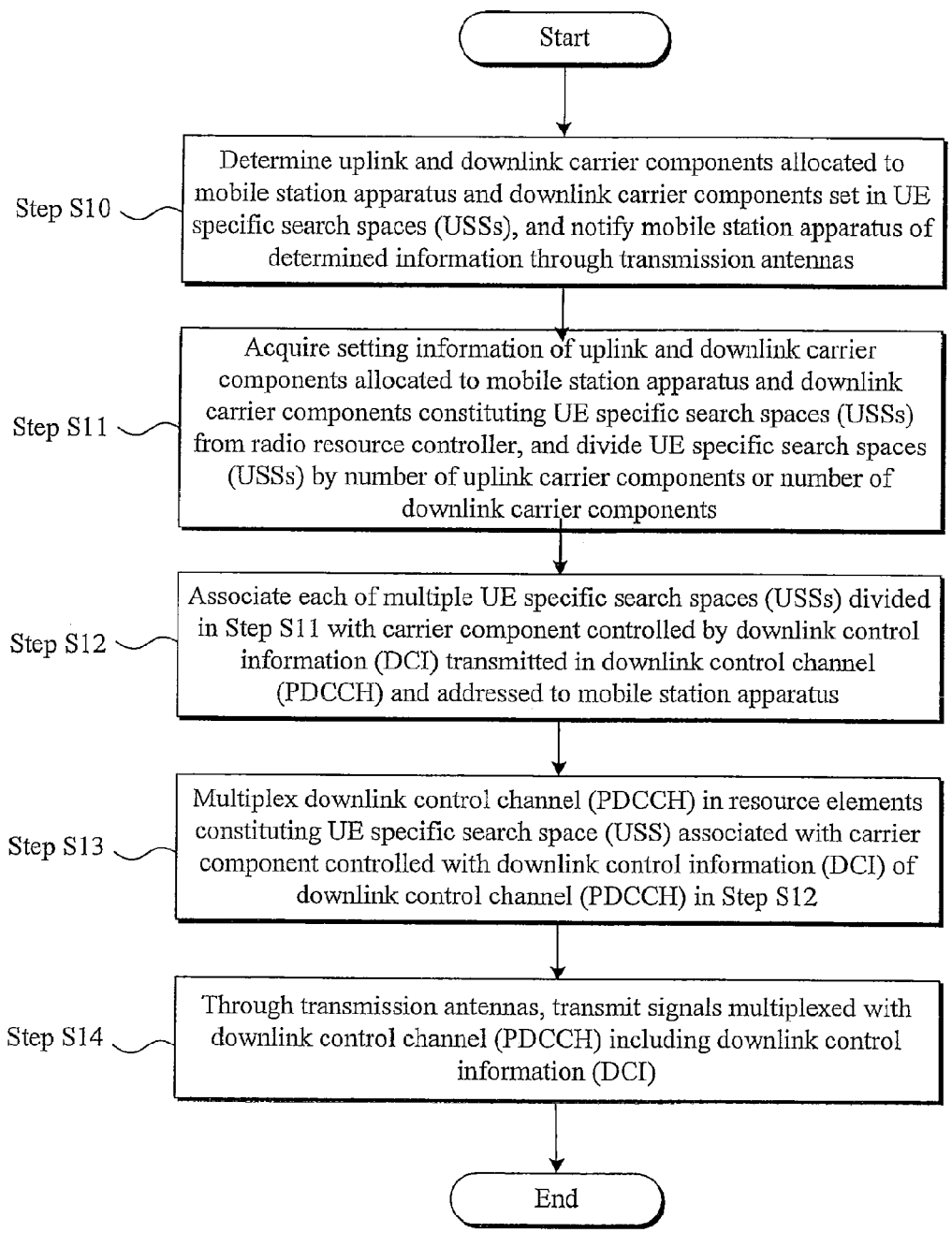
FIG. 8 is a flowchart for explaining an example of a flow of an operation of the base station apparatus in the embodiment.

FIG. 8 is a flowchart for explaining an example of a flow of an operation of the base station apparatus in the embodiment.

Upon start of processing, in Step S10 the radio resource controller 3*a* determines uplink and downlink carrier components allocated to the mobile station apparatus and downlink carrier components set in UE specific search spaces (USSs), and notifies the mobile station apparatus of the determined information through the transmission antennas. Then, the processing proceeds to Step S11.

In Step S11, the search space (SS)/carrier component associating unit 5*a* acquires from the radio resource controller 3*a* setting information of the uplink and downlink carrier components allocated to the mobile station apparatus and the downlink carrier components constituting the UE specific search spaces (USSs), and divides the UE specific search spaces (USSs) by the number of the uplink carrier components or the number of downlink carrier components. Then, the processing proceeds to Step S12.

In Step S12, the search space (SS)/carrier component associating unit 5a associates each of the multiple UE specific search spaces (USSs) divided in Step S11 with a carrier component controlled with downlink control information (DCI) transmitted in a downlink control channel (PDCCH) and addressed to the mobile station apparatus. Then, the processing proceeds to Step S13.

In Step S13, based on a control signal from the controller 5 including the search space (SS)/carrier component associating unit 5a, the multiplexer 27 multiplexes the downlink control channel (PDCCH) in resource elements constituting the UE specific search space (USS) associated with the carrier component controlled with the downlink control information (DCI) of the downlink control channel (PDCCH) Step S12. Then, the processing proceeds to Step S14.

In Step S14, the transmission processor 31 transmits the signals multiplexed with the downlink control channel (PDCCH) including the downlink control information (DCI), through the transmission antennas 33.

After Step S14, the base station apparatus terminates processing related to transmission of the downlink control channel (PDCCH).

(Processing flow in Mobile Station Apparatus)

Figure 9:
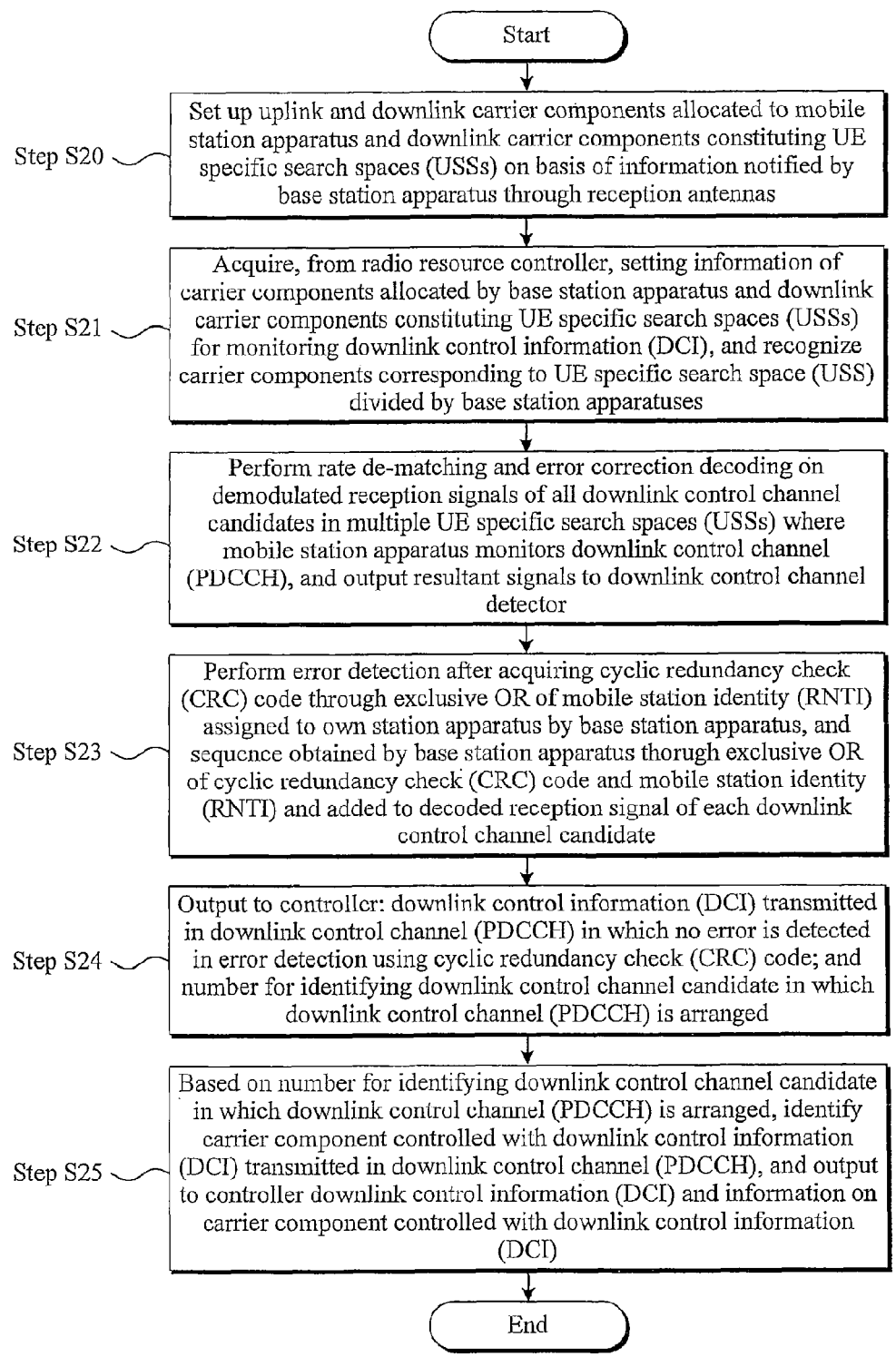
FIG. 9 is a flowchart for explaining an example of a flow of an operation of the mobile station apparatus in the embodiment.

FIG. 9 is a flowchart for explaining an example of a flow of an operation of the mobile station apparatus in the embodiment.

Upon start of processing, in Step S20 the radio resource controller 51a sets up uplink and downlink carrier components allocated to the mobile station apparatus and downlink carrier components constituting UE specific search spaces (USSs) on the basis of the information notified by the base station apparatus through the reception antennas 55. Then, the processing proceeds to step S21.

In Step S21, the carrier component identifying unit 53a acquires, from radio resource controller 51a, setting information of the carrier components allocated by the base station apparatus and the downlink carrier components constituting the UE specific search spaces (USSs) for monitoring the downlink control information (DCI), and recognizes carrier components corresponding to the UE specific search spaces (USSs) divided by the base station apparatus. Then, the processing proceeds to Step S22.

In Step S22, the decoder 65 performs rate de-matching and error correction decoding on the demodulated reception signals of all the downlink control channel candidates in the multiple UE specific search spaces (USSs) where the mobile station apparatus is to monitor a downlink control channel (PDCCH), and outputs the resultant signals to the downlink control channel detector 67. Then, the processing proceeds to Step S23.

In Step S23, the downlink control channel detector 67 perform error detection after acquiring a cyclic redundancy check (CRC) code through exclusive OR of a mobile station identity (RNTI) assigned to the mobile station apparatus by the base station apparatus and the sequence obtained by the base station apparatus through exclusive OR of the mobile station identity (RNTI) and the cyclic redundancy check (CRC) cede and added to the decoded reception signal of each downlink control channel candidate in the multiple UE specific search spaces (USSs) inputted by the decoder 65, thereby acquires a cyclic redundancy check (CRC) code, and then performs error detection. Then, the processing proceeds to Step S24.

In Step S24, the downlink control channel detector 67 outputs to the controller 53: the downlink control information (DCI) transmitted in the downlink control channel (PDCCH) in which no error is detected in error detection using a cyclic redundancy check (CRC) code; and a number for identifying one of the downlink control channel candidates in which the downlink control channel (PDCCH) is arranged. Then, the processing proceeds to Step S25.

In Step S25, based on the number inputted from the downlink control channel detector 67 and for identifying the downlink control channel candidate in which the downlink control channel (PDCCH) is arranged, the carrier component identifying unit 53a identifies a carrier component controlled with the downlink control information (DCI) transmitted in the downlink control channel (PDCCH), and outputs to the controller 53 the downlink control information (DCI) and the information on the carrier component controlled with the downlink control information (DCI).

After Step S25, the mobile station apparatus terminates processing related to reception of the downlink control channel (PDCCH).

Next, a description is given of a modification in which UE specific search spaces (USSs) are extended in accordance with the number of uplink or downlink carrier components allocated to the mobile station apparatus and then divided. Features of this modification can be expressed, for example, as follows, but may be modified according to description further given later.

(Base Station Apparatus)

A base station apparatus which allocates multiple component carriers in an uplink and a downlink to a mobile station apparatus and communicates with the mobile station apparatus by using the component carriers, the base station apparatus including: a search space/carrier component associating unit which divides corresponding UE specific search spaces (USSs) after extension thereof in accordance with the number of component carriers in the uplink or downlink allocated to the mobile station apparatus and associates the divided UE specific search spaces (USSs) with the component carriers, respectively; a multiplexer which arranges a signal of the downlink control channel in the search spaces with which one of the component carriers controlled with downlink control information of the downlink control channel is associated by the search space/carrier component associating unit; and a transmission processor which transmits the signal of the downlink control channel arranged by the multiplexer.

(Mobile Station Apparatus)

A mobile station apparatus which is assigned multiple component carriers in an uplink and a downlink by a base station apparatus and communicates with the base station apparatus by using the component carriers, the mobile station apparatus characterized by including: a controller which performs control in accordance with the number of component carriers in the uplink or downlink allocated to the mobile station apparatus so that UE specific search spaces (USSs) where a downlink control channel detector is to detect a downlink control channel are extended and then divided; the downlink control channel detector which detects the downlink control channel (PDCCH) from the multiple UE specific search spaces (USSs) where a signal of the downlink control channel is detected; and a component carrier identifying unit which identifies the component carriers which is controlled with downlink control information (DCI) transmitted in the downlink control channel (PDCCH) and addressed to the mobile station apparatus, from one of the UE specific search spaces (USSs) in which the downlink control channel detected by the downlink control channel detector is arranged.

The modification will be described below in detail. Note that parts described in this embodiment are cited, and characteristic parts will be described.

(Modification 1 of The Embodiment)

The radio communication system by which a carrier component is identified by dividing UE specific search spaces (USSs) and associating the divided UE specific search spaces (USSs) with carrier components has been heretofore described by using the drawings. In this case, the larger the number of the carrier components is, the smaller the number of control channel elements (CCEs) constituting each divided UE specific search space (USS), in other words, the number of downlink control channel candidates. In order to increase the number of the downlink control channel candidates constituting the divided UE specific search space (USS) and to enhance the degree of freedom in arranging downlink control channels, the UE specific search spaces (USSs) may be divided after being extended based on the number of carrier components allocated to the mobile station apparatus.

At this time, the base station apparatus 1 and the mobile station apparatus 2 exhibit the same operation except in that the following operation is different. In the base station apparatus 1, the search space (SS)/carrier component associating unit 5a allocates uplink and downlink carrier components to the mobile station apparatus, divides the UE specific search spaces (USSs) in accordance with the number of the uplink or downlink carrier components allocated to the mobile station apparatus after extension thereof, and associates the divided UE specific search spaces (USSs) with the carrier components.

In the mobile station apparatus 2, the controller 53 performs control so that the UE specific search spaces (USSs) where the downlink control channel detector is to detect the downlink control channel are extended and then divided in accordance with the number of the uplink and downlink carrier components allocated to the mobile station apparatus.

FIG. 10 is a diagram showing a modification of the UE specific search spaces (USSs) in the embodiment. FIG. 10 shows as an example only UE specific search spaces (USSs) of downlink control channel candidates each constituted of two control channel elements (CCEs) out of UE specific search spaces (USSs) allocated carrier components as in FIG. 2. The horizontal axis represents a number for identifying each control channel elements (CCEs). Hatched squares in the figure represent control channel elements (CCEs) constituting the UE specific search spaces (USSs). Outlined squares in the figure represent control channel elements (CCEs) not constituting the UE specific search spaces (USSs). Units each for the two control channel elements (CCEs) surrounded in the bold line in the figure represent downlink control channel candidates. Numbers assigned to the downlink control channel candidate in the figure are numbers for identifying the downlink control channel candidates. The numbers are assigned from 0 to the downlink control channel candidates each constituted of the same number of control channel elements in the UE specific search spaces (USSs).

In FIG. 10, a UE specific search space (USS) of each of UCC-0 and DCC-0 is constituted of downlink control channel candidates assigned "0" to "5," a UE specific search space (USS) of each of UCC-1 and DCC-1 is constituted of downlink control channel candidates assigned "6" to "11," and a UE specific search space (USS) of DCC-2 is constituted of downlink control channel candidates assigned "12" to "17." To put it differently, this is an example in which as large search spaces as UE specific search spaces (USSs) which are each allocated one uplink or downlink carrier component are increased by the number of the allocated carrier components, and thereby the UE specific search spaces (USSs) are extended.

(Modification 2 of The Embodiment)

The radio communication system by which a carrier component is identified by dividing UE specific search spaces (USSs) and associating the divided UE specific search spaces (USSs) with carrier components has been heretofore described by using the drawings. The embodiment may be applied to a Common Search Space (CSS).

At this time, the base station apparatus 1 and the mobile station apparatus 2 exhibit the same operation except in that the following operation is different. In the base station apparatus 1, the search space (SS)/carrier component associating unit 5a allocates uplink and downlink carrier components to the mobile station apparatus, divides the common search spaces (CSSs) in accordance with the number of the uplink or downlink carrier components allocated to the mobile station apparatus after extension thereof or without the extension thereof, and associates the divided common search spaces (CSSs) with the carrier components.

The multiplexer 27 arranges a downlink control channel (PDCCH) signal in the common search spaces (CSSs) which is associated, by the search space (SS)/carrier component associating unit 5a, with a carrier components controlled with downlink control information (DCI) of the downlink control channel (PDCCH). The transmission processor 31 transmits the downlink control channel (PDCCH) signal arranged by the multiplexer.

The controller 53 in the mobile station apparatus 2 performs control so that the common search spaces (CSSs) where the downlink control channel detector 67 is to detect the downlink control channel (PDCCH) can be divided after extension of the common search spaces (CSSs) in accordance with the number of uplink or downlink carrier components allocated to the mobile station apparatus or without the extension thereof.

The downlink control channel detector 67 detects the downlink control channel (PDCCH) from each of the multiple common search spaces (CSSs) for detecting the signal of the downlink control channel (PDCCH).

Based on the common search spaces (USS) where the downlink control channel (PDCCH) detected by the downlink control channel detector 67 is arranged, the carrier component identifying unit 53a identifies the carrier component controlled with the downlink control information (DCI) transmitted in the downlink control channel (PDCCH) and addressed to the own station apparatus.

Each of the common search spaces (CSS) is constituted of multiple control channel elements (CCEs) like the UE specific search spaces (USSs). Numbers of control channel elements (CCEs) constituting the UE specific search spaces (USSs) are determined based on the mobile station identity (RNTI), while numbers of control channel elements (CCEs) constituting the common search spaces (CSSs) are always constant numbers of control channel elements (CCEs) regardless of the mobile station identity (RNTI). For example, the common search spaces (CSSs) are constituted of control channel elements (CCEs) having consecutive numbers always from No. 0 to a predetermined number.

In other words, in the radio communication system of the present invention, a downlink control channel (PDCCII) includes: UE specific search spaces (USSs) different depending on the mobile station identity (RNTI); and common search spaces (CSSs) common to all the mobile station apparatuses or multiple ones. For example, downlink control information (DCI) common to all the mobile station apparatuses or multiple mobile station apparatuses, downlink control information (DCI) addressed to a specific mobile station apparatus, and the like are arranged in the common search spaces (CSSs). In addition, each of the common search spaces (CSSs) is formed for each carrier component. The mobile station apparatuses may monitor the common search spaces (CSSs) of respective carrier components or may monitor only common search spaces (CSSs) of carrier components constituting UE specific search spaces (USSs).

As in the UE specific search spaces (USSs) in FIG. 5 and FIG. 10, common search spaces (CSSs) may be divided evenly by the number of uplink carrier components or the number of downlink carrier components which are allocated to the mobile station apparatus, and thereby common search spaces (CSSs) may be formed corresponding to the uplink or downlink carrier components.

(Modification 3 of the Embodiment)

Downlink control information (DCI) addressed to a specific mobile station apparatus and downlink control information (DCI) common to all the mobile station apparatuses or multiple mobile station apparatuses are arranged in common search spaces (CSSs). However, since carrier components allocated to the mobile station apparatuses by the base station apparatus are different depending on the mobile station apparatus, how to divide or extend the common search spaces (CSSs) is different depending on the mobile station apparatus. Therefore, the present invention may be applied to only some type of downlink control information (DCI), in such a manner that the present invention is applied to only downlink control information (DCI) addressed to a specific mobile station apparatus and arranged in a corresponding one of the common search spaces (CSSs) and not applied to downlink control information (DCI) common to all the mobile station apparatuses or multiple mobile station apparatuses arranged in the common search space (CSS).

At this time, the base station apparatus 1 and the mobile station apparatus 2 exhibit the same operation except in that the following operation is different. In the base station apparatus 1, the search space (SS)/carrier component associating unit 5a allocates uplink and downlink carrier components to the mobile station apparatus, divides the corresponding common search spaces (CSSs) and the UE specific search spaces (USSs) in accordance with the number of the uplink or downlink carrier components allocated to the mobile station apparatus after extension of the common search spaces (CSSs) and the UE specific search spaces (USSs) or without extension thereof, and associates the divided common search spaces (CSSs) and UE specific search spaces (USSs) with the carrier components.

The multiplexer 27 arranges a signal of a downlink control channel (PDCCH) addressed to a specific mobile station apparatus in a corresponding one of the common search spaces (CSSs) and a corresponding one of the UE specific search spaces (USSs) associated by the search space (SS)/carrier component associating unit 5a with a carrier component controlled with the downlink control information (DCI) of the downlink control channel (PDCCH). The multiplexer 27 also arranges a signal in a corresponding one of the common search spaces (CSSs) which is controlled with downlink control information (DCI) of a downlink control channel (PDCCH) common to all the mobile station apparatuses or multiple mobile station apparatuses.

The transmission processor 31 transmits the signal of the downlink control channel (PDCCH) arranged by the multiplexer.

The controller 53 in the mobile station apparatus 2 performs control so that the UE specific search spaces (USSs) and the common search spaces (CSSs) where the downlink control channel detector 67 is to detect the downlink control channel (PDCCH) can be divided after extension of the common search spaces (CSSs) and the UE specific search spaces (USSs) in accordance with the number of uplink or downlink carrier components allocated to the mobile station apparatus or without the extension thereof.

From the multiple common search spaces (CSSs) and UE specific search spaces (USSs) where the signal of the downlink control channel (PDCCH) addressed to the mobile station apparatus is to be detected, the downlink control channel detector 67 detects the downlink control channel (PDCCH) addressed to the own station apparatus. From the common search spaces (CSSs) not extended and divided by the controller, the downlink control channel detector 67 also detects a downlink control channel (PDCCH) common to all the mobile station apparatuses or multiple mobile station apparatuses.

From one of the common search spaces (USS) and the UE specific search spaces (USSs) which is detected by the downlink control channel detector 67 and in which the downlink control channel (PDCCH) addressed to the mobile station apparatus is arranged, the carrier component identifying unit 53a identifies a carrier component controlled with the downlink control information (DCI) transmitted in the downlink control channel (PDCCH) and addressed to the own station apparatus. From the common search space (USS) in which the downlink control channel (PDCCH) common to all the mobile station apparatuses or multiple mobile station apparatuses is arranged and which is detected by the downlink control channel detector 67, the carrier component identifying unit 53a identifies a carrier component which is transmitted in the downlink control channel (PDCCH) and which is controlled with the downlink control information (DCI) common to all the mobile station apparatuses or multiple mobile station apparatuses.

Meanwhile, the embodiment may be applied to only UE specific search spaces (USSs) without being applying to common search spaces (CSSs). Alternatively, the embodiment may be applied to only the common search spaces (CSSs) without being applying to the UE specific search spaces (USSs). Still alternatively, the embodiment may be applied to both the common search spaces (CSSs) and UE specific search spaces (USSs).

As in the aforementioned embodiments of the present invention, each of multiple mobile station apparatus search spaces (USSs) or common search spaces (CSSs) is associated with an uplink or downlink carrier component, and thereby a carrier component controlled with downlink control information (DCI) can be identified by a mobile station apparatus. In addition, a carrier component corresponding to an uplink grant or a downlink grant can be identified without including an identity for identifying the carrier component in the downlink control information (DCI) and without increasing the coding ratio of the downlink control information (DCI).

For example, in order to identify five downlink carrier components, a 3-bit identity needs to be included in downlink control information (DCI). However, application of the present invention eliminates the need for including the 3-bit identity in the downlink control information (DCI), and thus the coding ratio of the downlink control information (DCI) can be made lower than in conventional techniques.

Moreover, not including an identity for identifying a carrier component in downlink control information (DCI) as in the present invention makes it possible to use the same downlink control information (DCI) as in the conventional techniques.

Programs running on the base station apparatus and the mobile station apparatuses according to the present invention are programs (programs for causing a computer to function) for controlling a CPU (Central Processing Unit) and the like for the purpose of implementing functions of the aforementioned embodiments according to the present invention. In addition, information handled by these apparatuses is accumulated temporarily in a RAM (Random Access memory) in processing thereof, then stored in any of various ROMs (Read Only Memories) such as a Flash ROM and an HDD (Hard Disk Drive), and read, modified or written by the CPU as necessary.

In addition, processing by the blocks of the apparatuses may be performed in the following manner. Specifically, a program for implementing the functions of the higher layer, the controller, the reception antennas, the reception processor, the demultiplexer, the demodulator, the decoder, the encoder, the modulator, the multiplexer, the transmission processor, and the transmission antennas in FIG. 6, and the higher layer, the controller, the reception antenna, the reception processor, the demultiplexer, the demodulator, the decoder, the downlink control channel detector, the encoder, the modulator, the multiplexer, the transmission processor, and the transmission antennas in FIG. 7 is recorded in a computer-readable recording medium, and the program recorded in this recording medium is read and executed by a computer system: Note that the "computer system" includes an OS and hardware such as a peripheral device.

In addition, the "computer-readable recording medium" is a storage device including a portable medium such as a flexible disk, a magneto optical disk, and a ROM or a CD-ROM, as well as a hard disk built in the computer system. Moreover, the "computer-readable recording medium" includes: one which dynamically holds a program for a short time like a communication wiring in a case of transmitting a program via a network such as the Internet or a communication line such as a telephone line; and one which holds a program for a certain time period like a volatile memory inside a computer system serving as a server or a client in the aforementioned case of transmitting the program. Besides, the program may implement a part of the aforementioned functions, and furthermore, may be capable of implementing the aforementioned functions in combination with a program already recorded in the computer system.

The embodiments of the present invention have been described in detail by referring to the drawings. However, a concrete configuration thereof is not limited to those in the embodiments, and the present invention includes a design modification and the like which do not depart from the scope of the present invention.

INDUSTRIAL APPLICABILITY

The present invention is usable for a communication apparatus.

All publications, patents and patent applications cited herein are incorporated herein by reference in their entity.

The invention claimed is:

1. A base station apparatus configured to communicate with a mobile station apparatus by using a plurality of downlink component carriers, the base station apparatus comprising:
   a radio resource controller configured to set, on a first downlink component carrier on which a physical downlink control channel is transmitted by the base station apparatus, a plurality of control channel elements that constitute a user equipment specific search space,
   the user equipment specific search space including a plurality of physical downlink control channel candidates,
   downlink control information being transmitted using one of the plurality of physical downlink control channel candidates on the first downlink component carrier,
   in a case that the downlink control information indicates a resource allocation of a physical downlink shared channel on a second downlink component carrier, the plurality of control channel elements being set on the basis of an index number of the second downlink component carrier by the radio resource controller; and
   a transmission processing unit configured to transmit the downlink control information using the one of the plurality of physical downlink control channel candidates on the first downlink component carrier.

2. The base station apparatus according to claim 1, wherein
   the base station apparatus further configured to communicate with the mobile station apparatus using one or more uplink component carriers,
   the plurality of control channel elements being for transmission of the downlink control information, and
   the plurality of control channel elements being set further on the basis of a number of the downlink component carriers and a number of the uplink component carrier(s).

3. The base station apparatus according to claim 1, wherein
   the base station apparatus further configured to communicate with the mobile station apparatus using one or more uplink component carriers,
   the plurality of control channel elements being for transmission of the downlink control information, and
   the plurality of control channel elements being set further on the basis of a larger number of a number of the downlink component carriers and a number of the uplink component carrier(s).

4. A mobile station apparatus configured to communicate with a base station apparatus by using a plurality of downlink component carriers, the mobile station apparatus comprising:
   a communication unit configured to monitor, on a first downlink component carrier on which a physical downlink control channel is transmitted, a plurality of control channel elements that constitute a user equipment specific search space,
   the user equipment specific search space including a plurality of physical downlink control channel candidates,
   downlink control information being received using one of the plurality of physical downlink control channel candidates on the first downlink component carrier,
   in a case that the downlink control information indicates a resource allocation of a physical downlink shared channel on a second downlink component carrier, the plurality of control channel elements monitored being on the basis of an index number of the second downlink component carrier; and
   a reception processing unit configured to receive the downlink control information on the one of the plurality of physical downlink control channel candidates on the first downlink component carrier.

5. The mobile station apparatus according to claim 4, wherein
   the mobile station apparatus further configured to communicate with the base station apparatus using one or more uplink component carriers,
   the plurality of control channel elements being for monitoring the downlink control information, and
   the plurality of control channel elements being monitored further on the basis of a number of the downlink component carriers and a number of the uplink component carrier(s).

6. The mobile station apparatus according to claim 4, wherein
the mobile station apparatus further configured to communicate with the base station apparatus using one or more uplink component carriers,
the plurality of control channel elements being for monitoring the downlink control information, and
the plurality of control channel elements being monitored further on the basis of a larger of a number of the downlink component carriers and a number of the uplink component carrier(s).

7. A communication method for a base station apparatus configured to communicate with a mobile station apparatus by using a plurality of downlink component carriers, the communication method comprising:
setting, on a first downlink component carrier on which a physical downlink control channel is transmitted by the base station apparatus, a plurality of control channel elements that constitute a user equipment specific search space,
the user equipment specific search space including a plurality of physical downlink control channel candidates,
downlink control information being transmitted using one of the plurality of physical downlink control channel candidates on the first downlink component carrier,
in a case that the downlink control information indicates a resource allocation of a physical downlink shared channel on a second downlink component carrier, the plurality of control channel elements being set on the basis of an index number of the second downlink component carrier; and
transmitting the downlink control information using the one of the plurality of physical downlink control channel candidates on the first downlink component carrier.

8. The communication method according to claim 7, wherein
the base station apparatus further configured to communicate with the mobile station apparatus using one or more uplink component carriers,
the plurality of control channel elements being for transmission of the downlink control information, and
the plurality of control channel elements being set further on the basis of a number of the downlink component carriers and a number of the uplink component carrier(s).

9. The communication method according to claim 7, wherein
the base station apparatus further configured to communicate with the mobile station apparatus using one or more uplink component carriers,
the plurality of control channel elements being for transmission of the downlink control information, and
the plurality of control channel elements being set further on the basis of a larger number of a number of the downlink component carriers and a number of the uplink component carrier(s).

10. A communication method for a mobile station apparatus configured to communicate with a base station apparatus by using a plurality of downlink component carriers, the communication method comprising:
monitoring, on a first downlink component carrier on which a physical downlink control channel is transmitted, a plurality of control channel elements that constitute a user equipment specific search space,
the user equipment specific search space including a plurality of physical downlink control channel candidates,
downlink control information being received using one of the plurality of physical downlink control channel candidates on the first downlink component carrier,
in a case that the downlink control information indicates a resource allocation of a physical downlink shared channel on a second downlink component carrier, the plurality of control channel elements monitored being on the basis of an index number of the second downlink component carrier; and
receiving the downlink control information on the one of the plurality of physical downlink control channel candidates on the first downlink component carrier.

11. The communication method according to claim 10, wherein
the mobile station apparatus further configured to communicate with the base station apparatus using one or more uplink component carriers,
the plurality of control channel elements being for monitoring the downlink control information, and
the plurality of control channel elements being monitored further on the basis of a number of the downlink component carriers and a number of the uplink component carrier(s).

12. The communication method according to claim 10, wherein
the mobile station apparatus further configured to communicate with the base station apparatus using one or more uplink component carriers,
the plurality of control channel elements being for monitoring the downlink control information, and
the plurality of control channel elements being monitored further on the basis of a larger number of a number of the downlink component carriers and a number of the uplink component carrier(s).

* * * * *